United States Patent
Cho et al.

(10) Patent No.: US 10,917,366 B2
(45) Date of Patent: Feb. 9, 2021

(54) METHOD AND APPARATUS FOR MANAGING MESSAGE IN ELECTRONIC DEVICE

(71) Applicant: Samsung Electronics Co., Ltd., Gyeonggi-do (KR)

(72) Inventors: Yoonsun Cho, Seoul (KR); Youbi Seo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 298 days.

(21) Appl. No.: 14/572,599

(22) Filed: Dec. 16, 2014

(65) Prior Publication Data

US 2015/0169208 A1    Jun. 18, 2015

(30) Foreign Application Priority Data

Dec. 16, 2013  (KR) .......................... 10-2013-0156122

(51) Int. Cl.
| | | |
|---|---|---|
| *H04L 12/58* | (2006.01) | |
| *G06F 3/0488* | (2013.01) | |
| *H04L 12/18* | (2006.01) | |
| *G06F 3/0482* | (2013.01) | |
| *G06Q 10/10* | (2012.01) | |

(52) U.S. Cl.
CPC ............ *H04L 51/04* (2013.01); *G06F 3/0482* (2013.01); *G06F 3/0488* (2013.01); *G06Q 10/107* (2013.01); *H04L 12/1827* (2013.01); *H04L 51/32* (2013.01)

(58) Field of Classification Search
CPC .... G06F 3/04847; G06F 3/0488; G06F 3/048; G06F 3/0482; G06F 3/04883; H04L 12/1827; H04L 51/04; H04L 51/32; H04L 51/16; G06Q 10/107; G04F 3/0488
USPC .................................................. 715/752, 791
See application file for complete search history.

(56) References Cited

U.S. PATENT DOCUMENTS

| | | | |
|---|---|---|---|
| 8,924,866 B2 | 12/2014 | Shin et al. | |
| 9,092,964 B1* | 7/2015 | Chan ....................... | G08B 21/02 |
| 9,690,441 B2 | 6/2017 | Kim et al. | |
| 2003/0088623 A1* | 5/2003 | Kusuda ................... | H04L 51/04 |
| | | | 709/204 |
| 2003/0210265 A1* | 11/2003 | Haimberg ............... | H04L 51/04 |
| | | | 715/758 |
| 2005/0114781 A1 | 5/2005 | Brownholtz et al. | |

(Continued)

FOREIGN PATENT DOCUMENTS

| | | |
|---|---|---|
| KR | 10-2009-0040090 A | 4/2009 |
| KR | 10-2010-0007228 | 1/2010 |

(Continued)

OTHER PUBLICATIONS

Office Action in connection with Korean Application No. 10-2013-0156122 dated Apr. 23, 2020, 12 pages.

*Primary Examiner* — Eric J Yoon

(57) ABSTRACT

Disclosed are a method and an apparatus for managing a message in an electronic device. The method includes displaying an application execution screen of an application. The method also includes displaying a marked message list when a touch input is sensed for extracting a marked message from the application execution screen. The method also includes switching to and displaying a chat window including a selected marked message, when the marked message is selected from the marked message list.

21 Claims, 22 Drawing Sheets

(56) References Cited

U.S. PATENT DOCUMENTS

| | | | |
|---|---|---|---|
| 2009/0177981 A1* | 7/2009 | Christie | G06F 3/04883 |
| | | | 715/758 |
| 2010/0011317 A1 | 1/2010 | Lee | |
| 2010/0175003 A1* | 7/2010 | Castellucci | H04L 51/04 |
| | | | 715/758 |
| 2011/0201363 A1 | 8/2011 | Shim et al. | |
| 2012/0304079 A1* | 11/2012 | Rideout | H04L 12/1818 |
| | | | 715/758 |
| 2013/0069969 A1* | 3/2013 | Chang | H04M 1/72552 |
| | | | 345/589 |
| 2013/0091443 A1 | 4/2013 | Park et al. | |
| 2013/0159878 A1* | 6/2013 | Kim | G06F 3/048 |
| | | | 715/752 |
| 2015/0012842 A1* | 1/2015 | Kuscher | H04L 65/403 |
| | | | 715/753 |
| 2015/0106741 A1* | 4/2015 | Friend | H04L 51/16 |
| | | | 715/752 |

FOREIGN PATENT DOCUMENTS

| | | |
|---|---|---|
| KR | 10-2011-0094630 A | 8/2011 |
| KR | 10-2013-0038477 A | 4/2013 |
| KR | 10-2013-0070045 A | 6/2013 |

* cited by examiner

FIG. 8C

| Status |
|---|

| < | Chat | ▽ |

| Gillian Jacobs (2) ▽ | ~809 |

| 2011.11.16  7:16AM<br>THE HOTEL IS THE NOVOTEL LOCATED IN FRONT OF EXIT 11 OF SINNONHYEON SUBWAY STATION.  > | ~817 |

825

| 2011.11.13  7:10AM<br>THE ADDRESS OF MY HOUSE IS 1599-1, SEOCHO 3-DONG, SEOCHO-GU, SEOUL.  > | ~819 |

| Soo-jung Kim (2) ▽ | ~811 |

| 2011.11.10  7:10AM<br>Message contents  > | ~821 |

| 2011.11.10  7:10AM<br>Message contents  > | ~823 |

| Amanda Seyfriends (7) ▽ | ~813 |

| Brian Peterson (1) ▽ | ~815 |

METHOD AND APPARATUS FOR MANAGING MESSAGE IN ELECTRONIC DEVICE

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2013-0156122, filed on Dec. 16, 2013, which is hereby incorporated by reference for all purposes as if fully set forth herein.

TECHNICAL FIELD

The present disclosure relates to a method and an apparatus for managing a message in an electronic device.

BACKGROUND

Currently, with the progress of digital technology, the use of various electronic devices (e.g., mobile communication terminals, smart phones, tablet Personal Computers (PCs), and the like) capable of performing communication and processing personal information is becoming common. Such an electronic device provides voice and video call services, message transmission/reception functions (e.g., a Short Message Service (SMS), a Multimedia Messaging Service (MMS), an email, and the like) an image capturing function, a function of reproducing an image or media (e.g., a moving image and music), an Internet function, a messenger function, and a Social Network Service (SNS).

In an embodiment, the electronic device supports a chatting service using the messenger function. The electronic device enables a user to transmit and receive, in real time, messages to/from at least one interlocutor through a messenger. Because a real-time conversation can be performed between users, the use of such a chatting service using the messenger is increasing.

SUMMARY

When a user desires to store a message during transmission and reception of messages, the electronic device provides a path enabling the storage of a message by using a function such as sharing and copying. For example, a message can be stored through an additional operation for invoking another application or another screen. The storage of a message through the additional operation may inconvenience the user.

Also, when a messenger service is used, the user has inconvenience in that the user may need to repeat a scrolling action in order to search for a particular message in a message window for conversation between the user and a particular interlocutor.

Further, when the user searches for a message in the messenger service, if the user selects a result of the search, the electronic device merely moves to a detailed page for only the relevant contents, but cannot perform a function of moving to the selected message and displaying a message related to the selected message.

To address the above-discussed deficiencies, it is a primary object to provide a method and an apparatus which, in an electronic device, can easily store a message that a user desires to remember or store among messages transmitted and received through a messenger. To this end, the electronic device is provided to set, as a marked message, a message that the user desires to remember during the exchange of messages and then enable the user to identify only the relevant marked message. Also, when the user intends to search for only a message transmitted by a particular person during group chatting, the electronic device is provided to filter only the message transmitted by the particular person and enable the user to easily and conveniently identify the filtered message. Accordingly, the electronic device can improve the convenience of searching for the particular message. When one of the found messages is selected, the electronic device moves to a message at a relevant time point, and enables the user to identify, all at once, messages exchanged at the relevant time point.

In accordance with an aspect of the present disclosure, a method for managing a message in an electronic device is provided. The method may include displaying an application execution screen of an application. The method also includes displaying a marked message list when a touch input is sensed for extracting a marked message from the application execution screen. The method also includes switching to and displaying a chat window including a selected marked message, when the marked message is selected from the marked message list.

In accordance with another aspect of the present disclosure, an apparatus for managing a message in an electronic device is provided. The apparatus may include a memory for storing a marked message and metadata on the marked message. The apparatus also includes a touch screen for displaying an application execution screen and a marked message list. The apparatus also includes a controller for controlling the touch screen to display the application execution screen; to display the marked message list when a touch input is sensed for extracting a marked message from the displayed application execution screen; and to switch to and display a chat window including a selected marked message, when the marked message is selected from the marked message list.

The method and the apparatus for managing a message in the electronic device, according to an embodiment of the present disclosure, can meet the needs of a user who intends to quickly store a particular message or search for only the particular message in a messenger service. Also, the electronic device allows the user to search for even other conversations at a time point when the found conversation has occurred. Accordingly, the electronic device can improve search and/or reference-related usability in the messenger service. Further, the electronic device may be provided to move to an actual time point of the relevant conversation and enable the user to immediately identify related contents on the basis of a result of the search.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A to 8D illustrate views for explaining a method for extracting a marked message from an interlocutor list screen according to an embodiment of the present disclosure;

DETAILED DESCRIPTION

Figure 1:
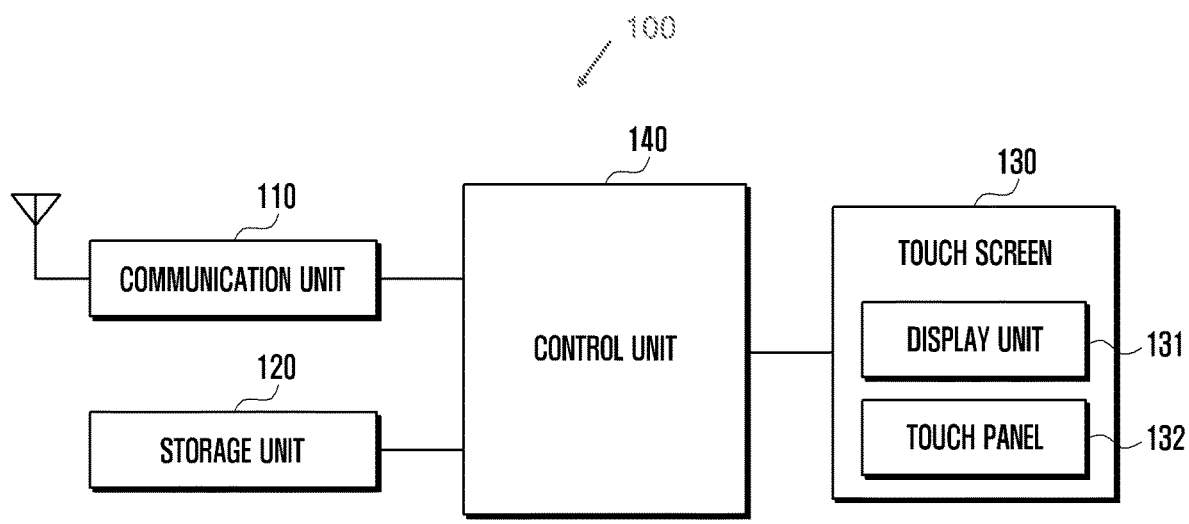
FIG. 1 illustrates a block diagram showing a configuration of an electronic device including a touch device according to an embodiment of the present disclosure.

FIGS. 1 through 10E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, various embodiments of the present disclosure will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

Example embodiments of the present disclosure shown and described in this specification and the drawings correspond to specific examples presented in order to easily explain technical contents of the present disclosure, and to help comprehension of the present disclosure, but are not intended to limit the scope of the present disclosure. It will be apparent to those having ordinary knowledge in the technical field, to which the present disclosure pertains, that it is possible to practice other modified embodiments based on the technical idea of the present disclosure as well as the embodiments disclosed herein.

Before the detailed description, an electronic apparatus 100 according to the present disclosure may be a mobile communication terminal, a smartphone, a tablet Personal Computer (PC), a hand-held PC, a Portable Multimedia Player (PMP), a Personal Digital Assistant (PDA), a notebook PC or the like.

In embodiments of the present disclosure, an application is a communication application for transmitting and receiving messages between electronic devices, and may include a Social Network Service (SNS) application; an email service application; a one-to-one and group chatting messenger service application; a message service application for exchanging text and multimedia messages; and the like.

Also, in the embodiments of the present disclosure, a marked message refers to a message including a message that a user desires to remember or store among messages transmitted and received to/from at least one interlocutor. Also, by applying a marking icon to the marked message, the marked message may be displayed so as to be distinguished from a message which is not marked. Here, a situation will be described in which the marking icon is a PIN icon. In an embodiment, only the marked message may be filtered and displayed in terms of an interlocutor. When one of the filtered messages is selected, an electronic device may switch to a message screen at a relevant time point, and may display other related messages (i.e., previous and/or following messages) exchanged at the relevant time point.

Further, in the embodiments of the present disclosure, metadata is information on a marked message, and may include a name of an interlocutor; a marked message related to the interlocutor and the number of marked messages related to the interlocutor; and data information and time information corresponding to the marked message. In the embodiments of the present disclosure, marked messages may be arranged and displayed based on the metadata.

FIG. 1 illustrates a block diagram showing a configuration of an electronic device including a touch device according to an embodiment of the present disclosure;

Referring to FIG. 1, the touch device according to an embodiment of the present disclosure may include a communication unit 110, a memory 120, a touch screen 130, and a controller 140.

The communication unit 110 performs a voice call, a video call, or data communication between the electronic device and an external device through a network. The communication unit 110 may include a Radio Frequency (RF) transmitter for upconverting a frequency of a signal to be transmitted and amplifying the frequency-upconverted signal, an RF receiver for low-noise amplifying a received signal and downconverting a frequency of the low-noise amplified signal, and the like. Also, the communication unit 110 may include a modulator and a demodulator. Each of the modulator and the demodulator may include a Code Division Multiple Access (CDMA) block, a Wideband CDMA (WCDMA) block, a Long Term Evolution (LTE) block, a Wi-Fi block, a Wireless Broadband (WiBro) block, a Bluetooth block, and a Near Field Communication (NFC) block, and the like. The communication unit 110 may be a mobile communication module, an Internet communication module, and/or a short-range communication module.

The memory 120 may include a program memory that stores an operating program of the electronic device, and a data memory that stores data generated during execution of a program.

In an embodiment, in an embodiment of the present disclosure, the memory 120 may store a marked message, for which marking is set among messages transmitted and received by the communication unit 110.

The touch screen 130 may be implemented as a one-body unit including a display unit 131 and a touch panel 132. Under the control of the controller 140, the display unit 131 may display various screens according to the use of the electronic device. The display unit 131 may be implemented by a Liquid Crystal Display (LCD), an Organic Light Emitting Diode (OLED) display, and/or an Active Matrix Organic Light Emitting Diode (AMOLED) display. The touch panel 132 may be an integrated touch panel including a hand touch panel that senses a hand gesture and a pen touch panel that senses a pen gesture.

In an embodiment, in an embodiment of the present disclosure, the display unit 131 may display an application execution screen under the control of the controller 140. A marked message may be displayed in such a manner as to apply a marking icon to the marked message, when a gesture for setting a marked message is sensed through the touch panel 132 on an execution screen (e.g., a screen for transmitting and receiving messages to/from a particular interlocutor) displayed by the display unit 131. In an embodiment, when a gesture for extracting the marked message is sensed through the touch panel 132, under the control of the controller 140, the display unit 131 may filter only the marked message and may display the filtered the marked message.

The controller 140 controls an overall operation of the electronic device and a signal flow between internal elements of the electronic device, processes data, and controls the supply of power from a battery to the elements.

In an embodiment, in an embodiment of the present disclosure, the controller 140 may control the display unit 131 to display an application execution screen. When sensing a gesture for marking a message through the touch panel 132 on the application execution screen, the controller 140 may set a relevant message as a marked message. In an embodiment, when sensing a gesture for extracting a marked message through the touch panel 132, the controller 140 may filter only the marked message and may display the filtered marked message in the form of a list. When one of messages displayed in the list is selected, the controller 140 may control the display unit 131 to switch to and display a chat window in which the selected message has been displayed. In an embodiment, the controller 140 may control the display unit 131 to cause a scroll bar to automatically move to a point of the marked message in the chat window and display the chat window in such a manner that the scroll bar focuses on the marked message.

Besides, the electronic device may selectively further include elements having additional functions, such as a Global Positioning System (GPS) module for receiving location information, a camera module for capturing a still image and a moving image, an audio processing unit including a microphone and a speaker, a broadcast receiving module for receiving a broadcast signal, an input unit for supporting hard key-based input, and the like. However, a description and illustration thereof will be omitted.

Figure 2:
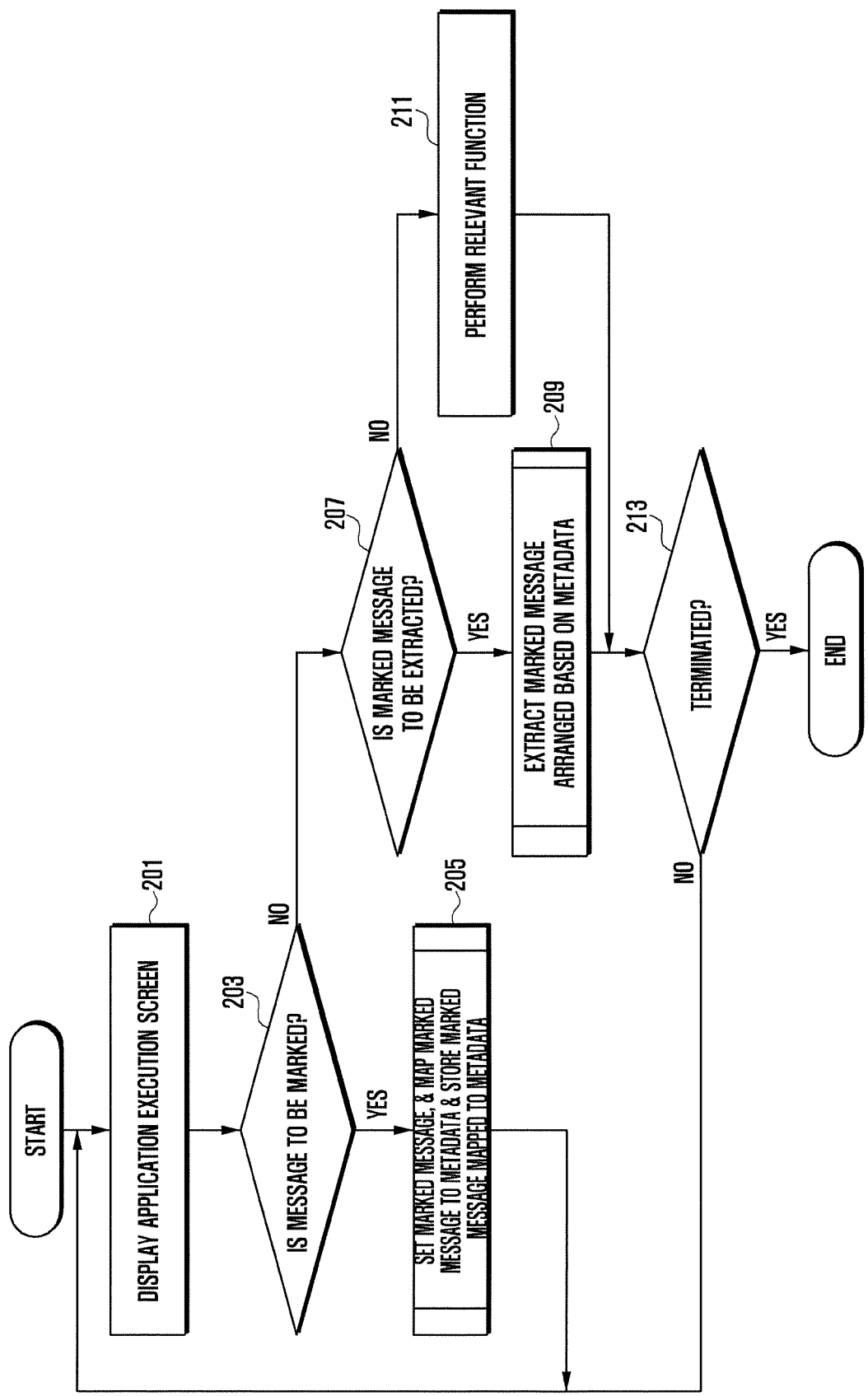
FIG. 2 illustrates a process for managing a message according to an embodiment of the present disclosure.

FIG. 2 illustrates a process for managing a message according to an embodiment of the present disclosure.

Referring to FIG. 2, in operation 201, the controller 140 may control the display unit 131 to display an application execution screen of an application. Here, the application may include an SNS application; an email service application; a one-to-one and group chatting messenger service application; and a message service application for exchanging text and multimedia messages. In an embodiment of the present disclosure, a situation will be described in which the application is a messenger application.

Also, the application execution screen may include a chat window screen for transmitting and receiving messages to/from at least one interlocutor, a screen of an interlocutor list including interlocutors registered in an application or the electronic device, and the like. The message may include text, an image, voice, image data, and the like. In operation 203, the controller 140 may determine whether a message is to be marked on the application execution screen displayed by the display unit 131. In an embodiment of the present disclosure, whether a message is to be marked may be determined according to whether a message marking gesture occurs. In addition, a situation will be described in which a marked message is set by a long tap gesture. When a message marking gesture has occurred, in operation 205, the controller 140 may set a marked message for a message at a position, where the message marking gesture is sensed, in response to the message marking gesture. Then, the controller 140 may map the marked message to metadata corresponding to the marked message, and may store the marked message mapped to the metadata in the memory 120. Here, the metadata is information on a marked message, and may include a name of an interlocutor; a marked message related to the interlocutor and the number of marked messages related to the interlocutor; and data information and time information corresponding to the marked message.

Specific execution blocks of operation 205 illustrated in FIG. 2 will be described in detail with reference to FIG. 3.

Figure 3:
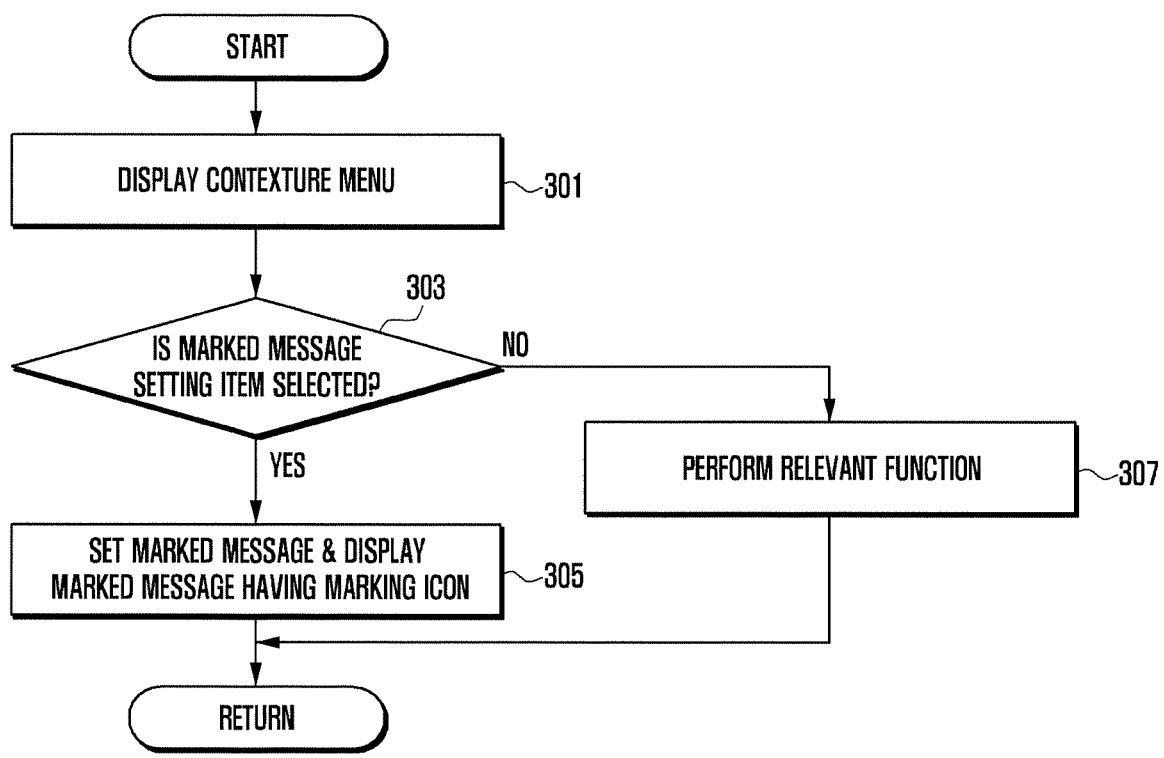
FIG. 3 illustrates a process for setting a marked message according to an embodiment of the present disclosure.

FIG. 3 illustrates a process for setting a marked message according to an embodiment of the present disclosure.

Referring to FIG. 3, in operation 301, the controller 140 may control the display unit 131 to display a contexture menu in response to the message marking gesture which has occurred in operation 203 illustrated in FIG. 2. Here, the contexture menu refers to a menu including an operation item capable of being performed in relation to a message at a position where a gesture has been sensed. Examples of the operation item may include message delivery, message copying, message sharing, and the like. In operation 303, the controller 140 may determine whether a marked message setting item is selected from among items of the contexture menu. When the marked message setting item is selected, in operation 303, the controller 140 may sense the selection of the marked message setting item, and, in operation 305, may set, as a marked message, a message at a position where the gesture has been sensed. In an embodiment, the marked message may have a separate marking icon (e.g., a PIN icon). Here, examples of the marking icon may include a PIN icon and a star icon. In an embodiment of the present disclosure, a situation will be described in which the marking icon is expressed as a PIN icon. By using the marking icon, the marked message may be distinguished from an unmarked message.

In contrast, when the marked message setting item is not selected in operation 303, in operation 307, the controller 140 may perform a relevant function. Here, examples of the relevant function may include operations, such as message copying, message sharing, and the like.

Specific execution blocks of the process illustrated in FIG. 3 will be described with reference to FIGS. 4A to 4C.

Figure 4A:
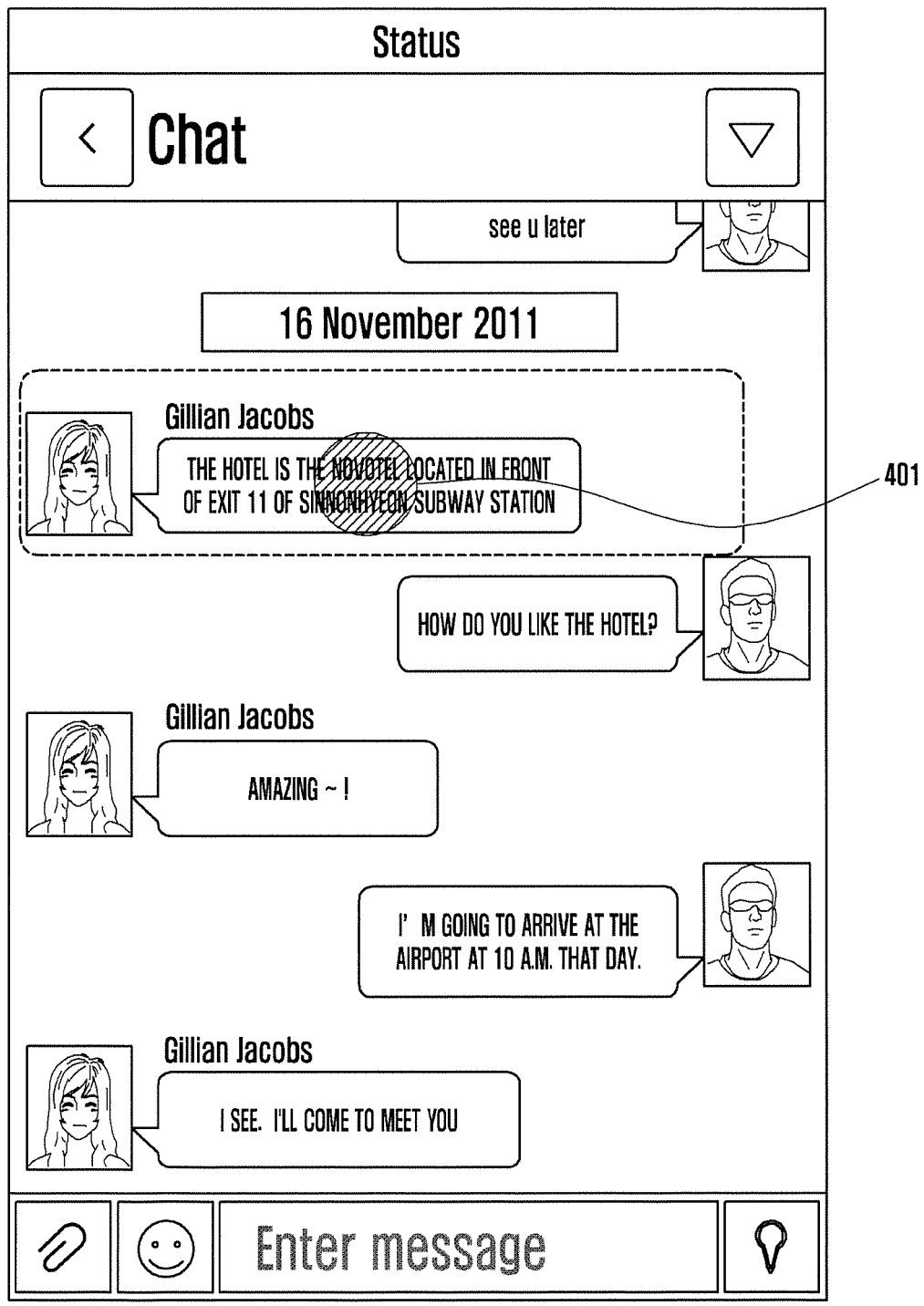
FIGS. 4A to 4C illustrate views for explaining a method for setting a marked message according to an embodiment of the present disclosure.
Figure 4B:
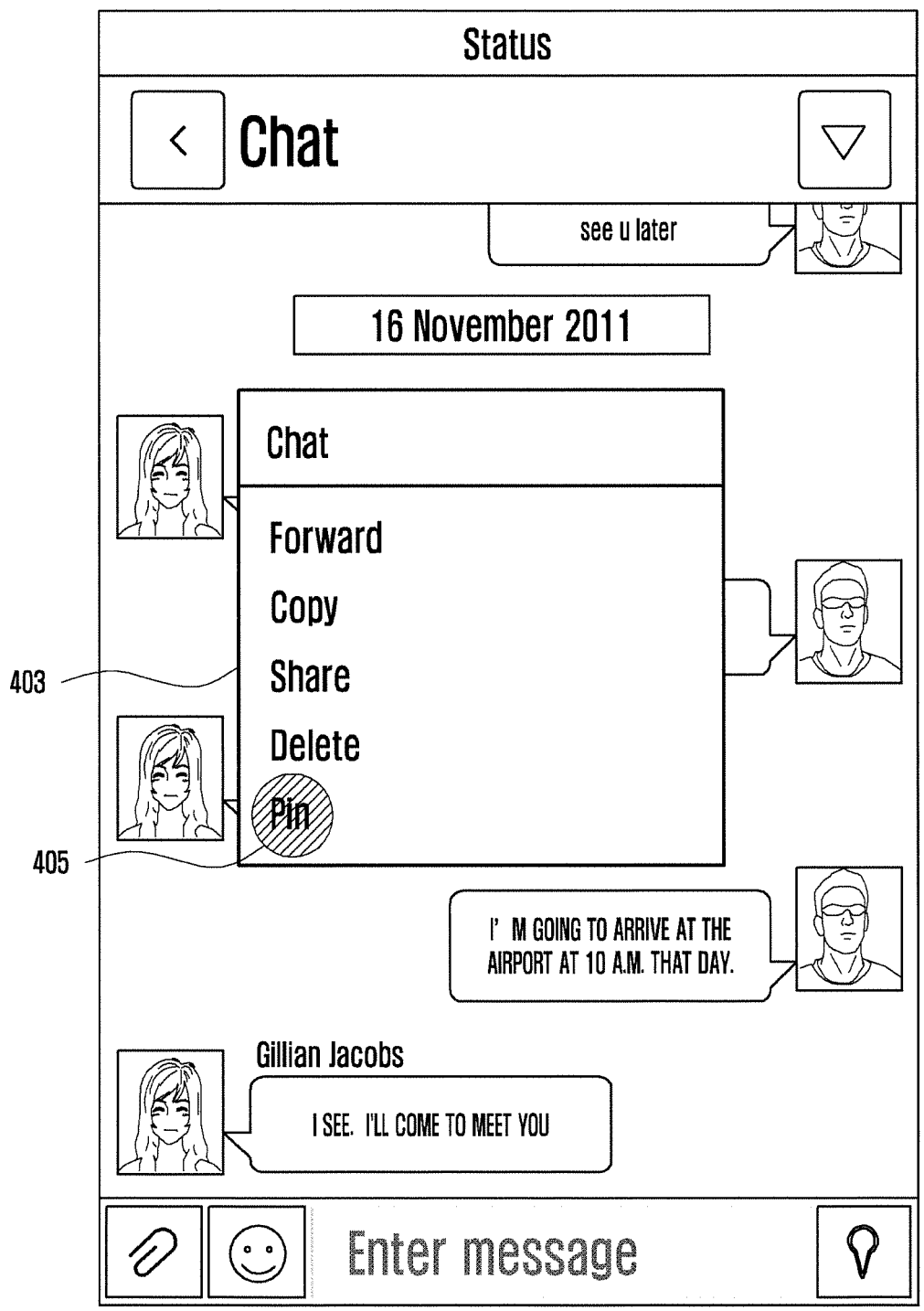
Figure 4C:
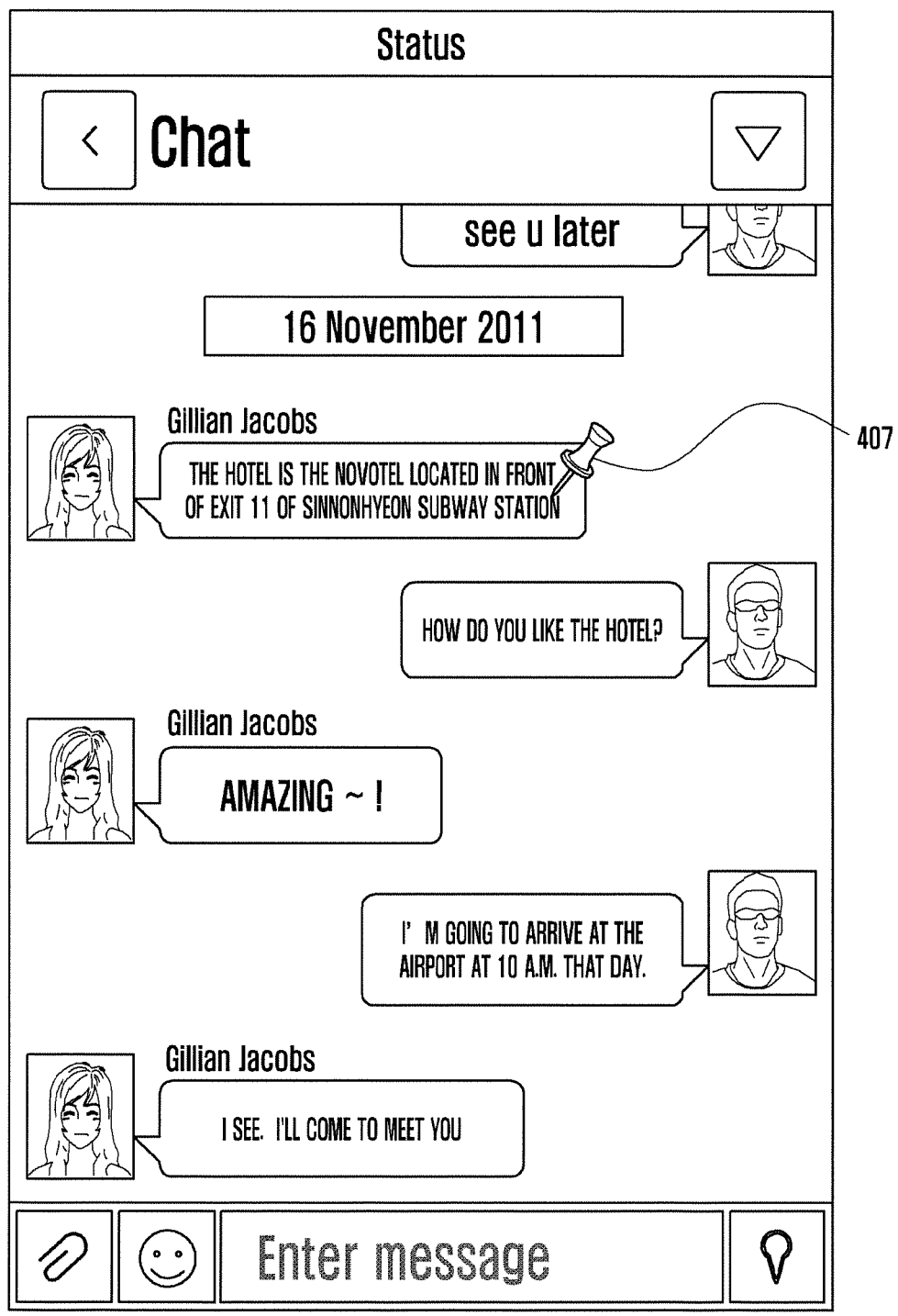

FIGS. 4A to 4C illustrate views for explaining a method for setting a marked message according to an embodiment of the present disclosure.

Referring to FIGS. 4A to 4C, the controller 140 may display a messenger execution screen including messages transmitted and received to/from one interlocutor through the display unit 131, as illustrated in FIG. 4A. When a long tap gesture occurs with respect to a message as indicated by reference numeral 401 on the messenger execution screen displayed by the display unit 131, the controller 140 may display a contexture menu 403 including operation items capable of being performed in relation to a message in response to the long tap gesture, as indicated by reference numeral 403 in FIG. 4B. The displayed contexture menu 403 may include a Forward item, a Copy item, a Share item, a Delete item, a PIN item (i.e., a marked message setting item), and the like. When the PIN item is selected from the contexture menu 403 as indicated by reference numeral 405 in FIG. 4B, the controller 140 may set, as a marked message, the message (reference numeral 401 in FIG. 4A) at a position where the long tap gesture has occurred. The marked message may separately have a PIN icon as indicated by reference numeral 407 in FIG. 4C. By using the PIN icon, it may be identified that the message has been set and stored as the marked message. In an embodiment, the marked message may be stored, together with metadata corresponding to the marked message, in the memory 120.

Returning back to the description of FIG. 2, when the message marking gesture has not occurred in operation 203, in operation 207, the controller 140 may determine whether a marked message is to be extracted. In an embodiment of the present disclosure, whether the marked message is to be extracted may be determined according to whether a marked message extraction gesture occurs. When the marked message extraction gesture does not occur, in operation 211, the controller 140 may perform a relevant function. Examples of the relevant function may include operations, such as message input, message deletion, and the like.

In contrast, when the marked message extraction gesture occurs, in operation 209, the controller 140 may extract the marked message on the basis of metadata. Here, the metadata is information on a marked message, and may include a name of an interlocutor; a marked message related to the interlocutor and the number of marked messages related to the interlocutor; and data information and time information corresponding to the marked message.

Specific execution blocks of operation 209 illustrated in FIG. 2 will be described in detail with reference to FIG. 5.

Figure 5:
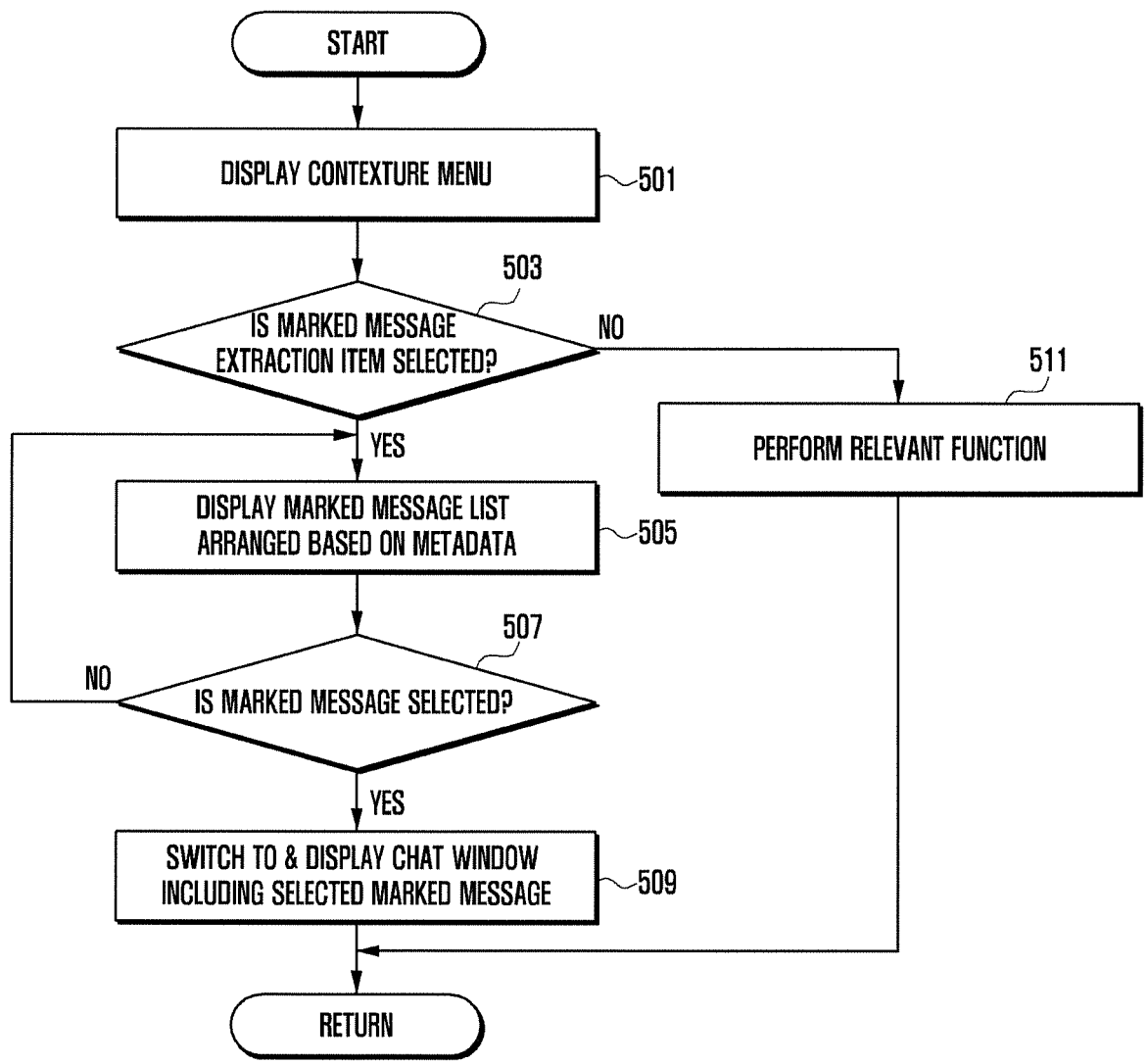
FIG. 5 illustrates a process for extracting a marked message according to an embodiment of the present disclosure.

FIG. 5 illustrates a process for extracting a marked message according to an embodiment of the present disclosure.

Referring to FIG. 5, in operation 501, the controller 140 may control the display unit 131 to display a contexture menu in response to a marked message extraction gesture. Here, the contexture menu may include operation items capable of being performed in relation to a chat window and/or an interlocutor. In operation 503, the controller 140 may determine whether a marked message extraction item is selected from the contexture menu. When the marked message extraction item is selected, in operation 505, the controller 140 may arrange the extracted marked messages on the basis of metadata, and may control the display unit 131 to display the arranged marked messages in the form of a list. Here, the metadata is information on a marked message, and may include a name of an interlocutor; a marked message related to the interlocutor and the number of marked messages related to the interlocutor; and data information and time information corresponding to the marked message. As described above, a marked message list may be arranged on the basis of metadata. For example, the marked message list may be arranged in order of pieces of time information and/or on the basis of interlocutor information, according to an application execution screen. In an embodiment, when the application execution screen is a chat window screen for transmitting and receiving messages to/from at least one interlocutor, the marked message list may be arranged in order of time. Alternatively, when the application execution screen is an interlocutor list, the marked message list may be arranged on the basis of an interlocutor (e.g., in order of names of interlocutors).

In operation 507, the controller 140 may determine whether one marked message is selected from the marked message list. When one marked message is selected from the marked message list, in operation 509, the controller 140 may switch to and display a chat window including the selected marked message. In an embodiment, the controller 140 may cause a scroll bar to automatically move to a point of the selected marked message in the chat window, and may display the chat window in such a manner that the scroll bar focuses on the selected marked message.

In contrast, when the marked message extraction item is not selected in operation 503, in operation 511, the controller 140 may perform a relevant function. Here, examples of the relevant function may include operations, such as message copying, message sharing, setting of a marked message, and the like.

Returning back to the description of FIG. 2, after extracting the marked messages arranged on the basis of the metadata in operation 209, in operation 213, the controller 140 may determine whether a termination command is generated. Here, the termination command may be a command for terminating an application. When the termination command is generated, the controller 140 may terminate a relevant application. In contrast, when the termination command is not generated, the controller 140 may branch back to operation 201 and may control the display unit 131 to display an application execution screen.

Figure 6:
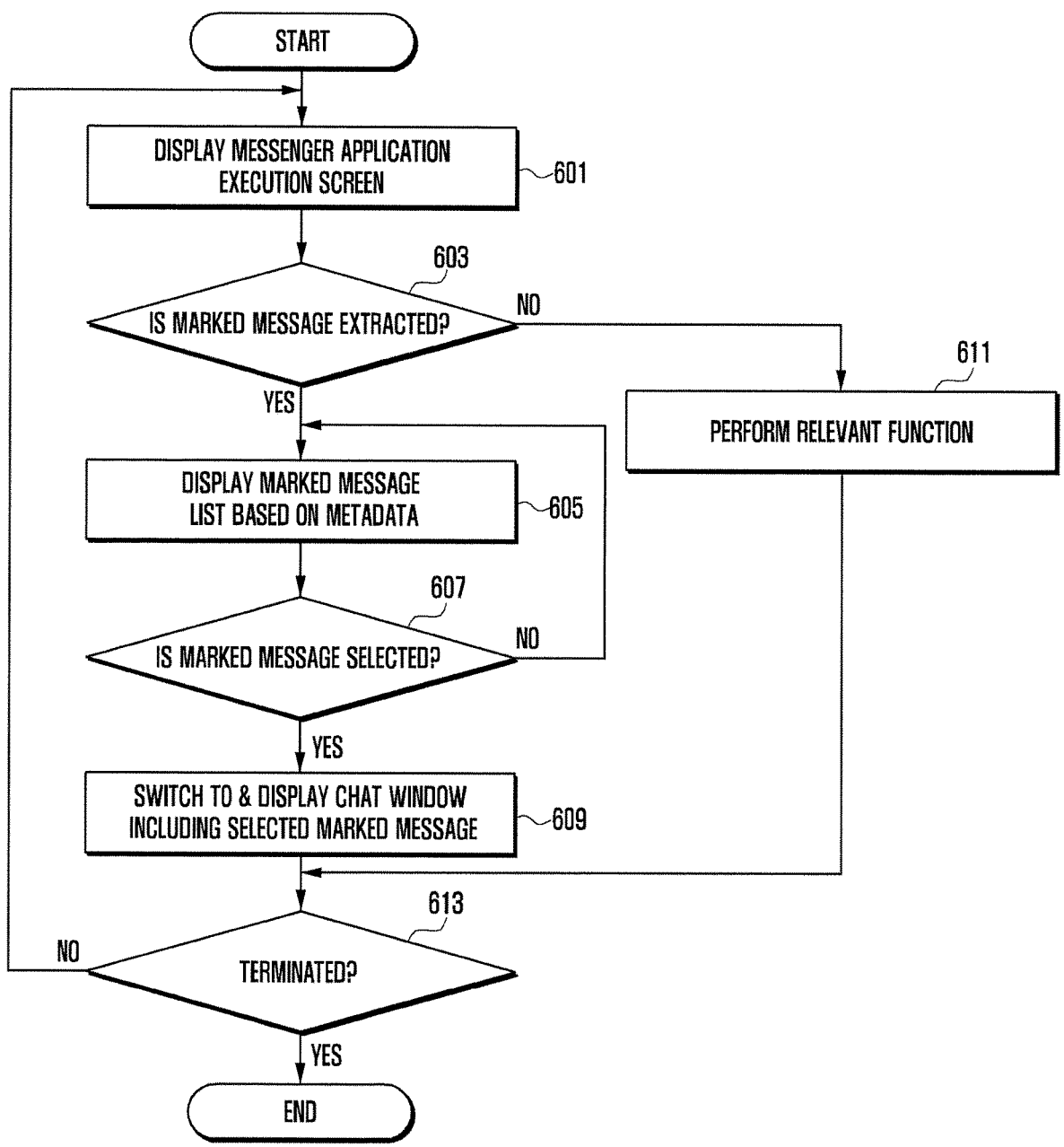
FIG. 6 illustrates a process for extracting a marked message in a messenger application according to an embodiment of the present disclosure.

FIG. 6 illustrates a process for extracting a marked message in a messenger application according to an embodiment of the present disclosure.

Referring to FIG. 6, in operation 601, the controller 140 may control the display unit 131 to display a messenger application execution screen. The messenger application execution screen may include a chat window screen (e.g., a one-to-one chat window and a group chat window) and an interlocutor list screen. The controller 140 may determine whether a touch input is sensed on a menu item, which is separately installed in the messenger application execution screen, on the messenger application execution screen displayed by the display unit 131. When the touch input occurs on the menu item, the controller 140 may control the display unit 131 to display a contexture menu related to the execution screen. The contexture menu may include an Invite buddies item, a Chat info item, an Alert off item, a Translate item, and a PIN message item (i.e., a marked message search item). In operation 603, the controller 140 may determine, from the contexture menu, whether a marked message is extracted. In an embodiment, the controller 140 may determine whether an input corresponding to the selection of the PIN message item of the contexture menu is received. When the PIN message item is selected, in operation 603, the controller 140 may sense the selection of the PIN message item. In operation 605, the controller 140 may arrange marked messages corresponding to an interlocutor on the basis of metadata, and may display the arranged marked messages in the form of a list. Here, the metadata is information on a marked message, and may include a name of an interlocutor; a marked message related to the interlocutor and the number of marked messages related to the interlocutor; and data information and time information corresponding to the marked message.

In operation 607, the controller 140 may determine whether one marked message is selected from the marked message list. When one marked message is selected from the marked message list, in operation 607, the controller 140 may sense the selection of the one marked message and, in operation 609, may switch to and display a chat window including the selected marked message. In an embodiment, the controller 140 may cause a scroll bar to automatically move to a point of the selected marked message in the chat window, and may display the chat window in such a manner that the scroll bar focuses on the selected marked message. Also, the controller 140 may cause the chat window to include messages before and/or after the selected marked message. When the chat window including the marked message is deleted, the controller 140 may determine whether the marked message is to be deleted. When deleting the chat window, the controller 140 may delete the marked message together with the chat window. When extracting the marked message, the controller 140 may not display the deleted marked message in a marked message list. Alternatively, when deleting the chat window, the controller 140 may not delete the marked message. Because the chat window has been deleted, the controller 140 may not perform an operation for switching to a chat window, and may display only marked message information.

In contrast, when the input corresponding to the selection of the PIN message item of the contexture menu is not received in operation 603, in operation 611, the controller 140 may perform a relevant function, such as invitation of an interlocutor, chat window information, deletion of a message, and the like.

In operation 613, the controller 140 may sense a termination command. When the termination command is generated, the controller 140 may terminate the operation for extracting a marked message. In contrast, when the termination command is not generated, the controller 140 may branch back to operation 601.

A method for extracting a marked message will be described in detail with reference to FIGS. 7A to 7D and FIGS. 8A to 8D.

FIGS. 7A to 7D illustrate views for explaining a method for extracting a marked message from a one-to-one chat window according to an embodiment of the present disclosure.

In an embodiment of the present disclosure, a situation will be described in which a screen displayed by executing a messenger application as illustrated in each of FIGS. 7A to 7D is a one-to-one chat window screen for transmitting and receiving messages to/from one interlocutor.

Figure 7A:
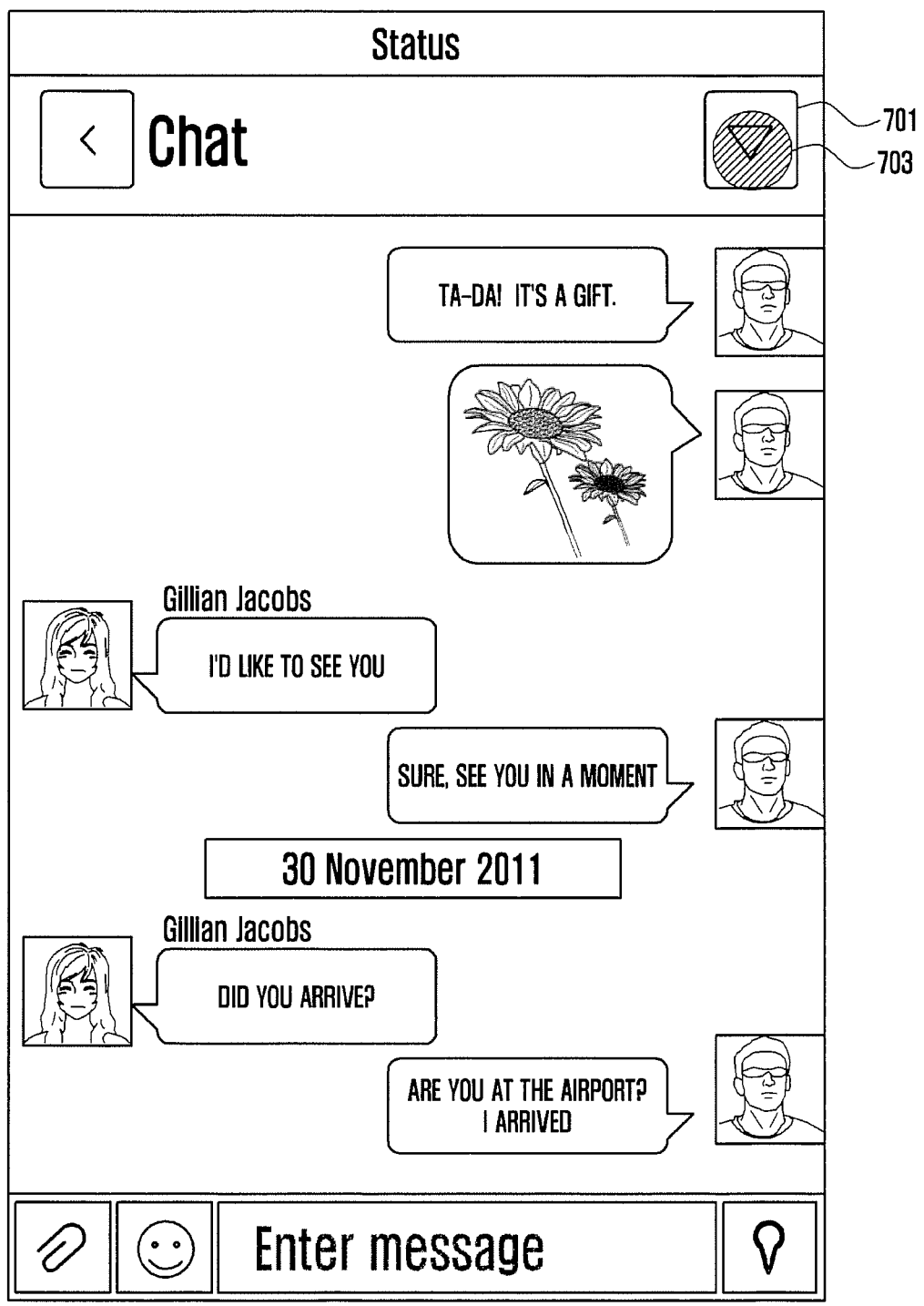
FIGS. 7A to 7D illustrate views for explaining a method for extracting a marked message from a one-to-one chat window according to an embodiment of the present disclosure.
Figure 7B:
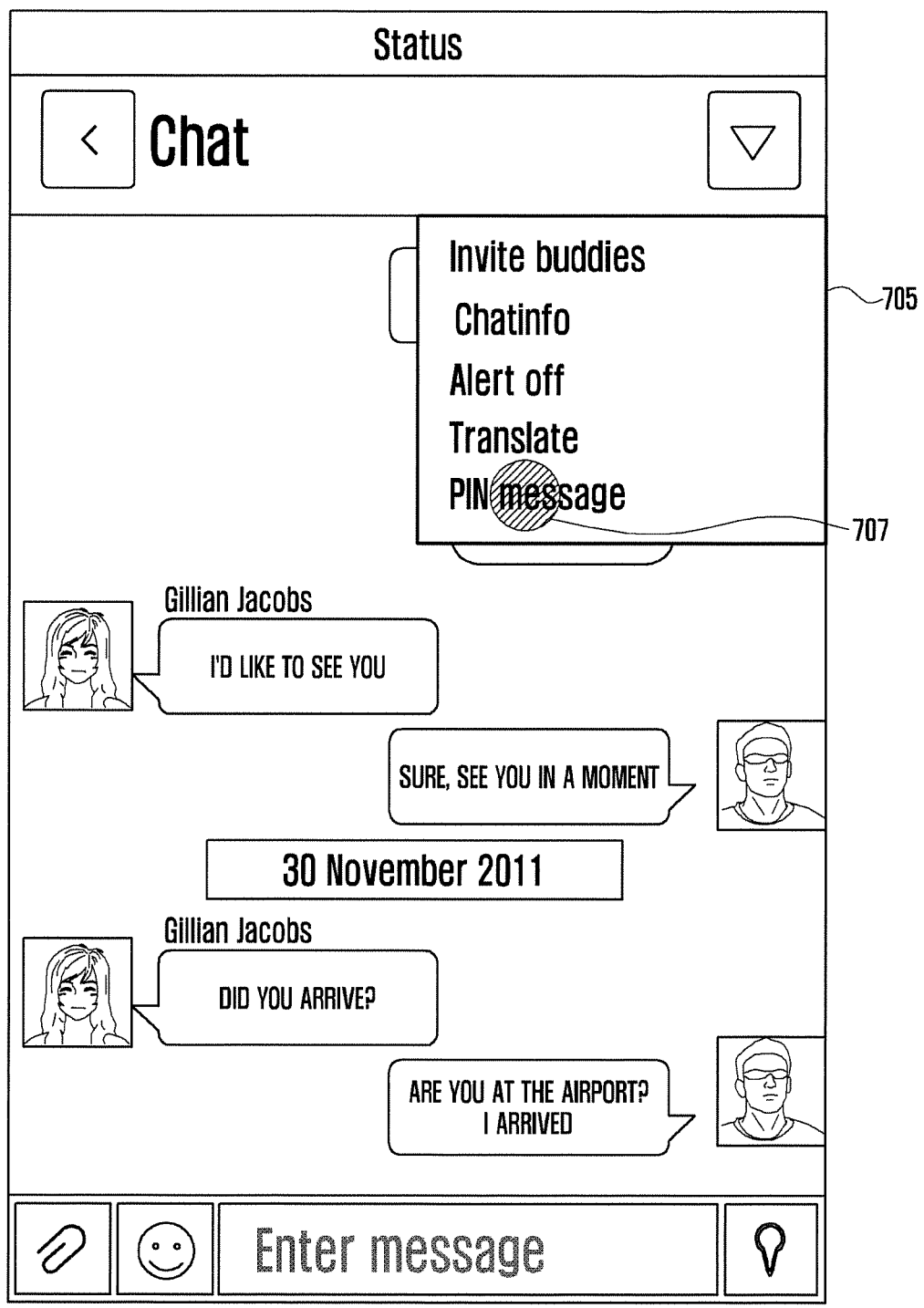
Figure 7C:
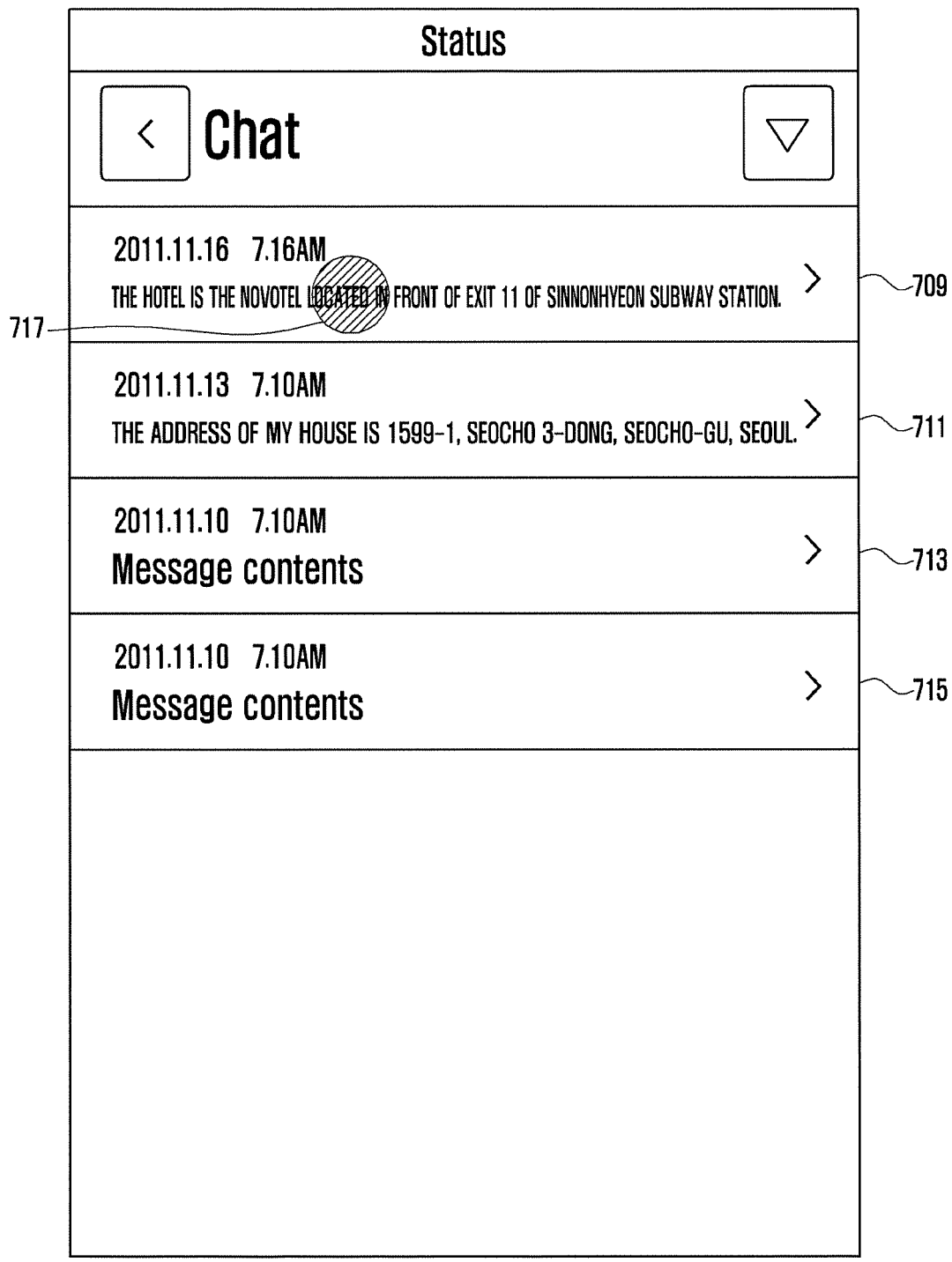
Figure 7D:
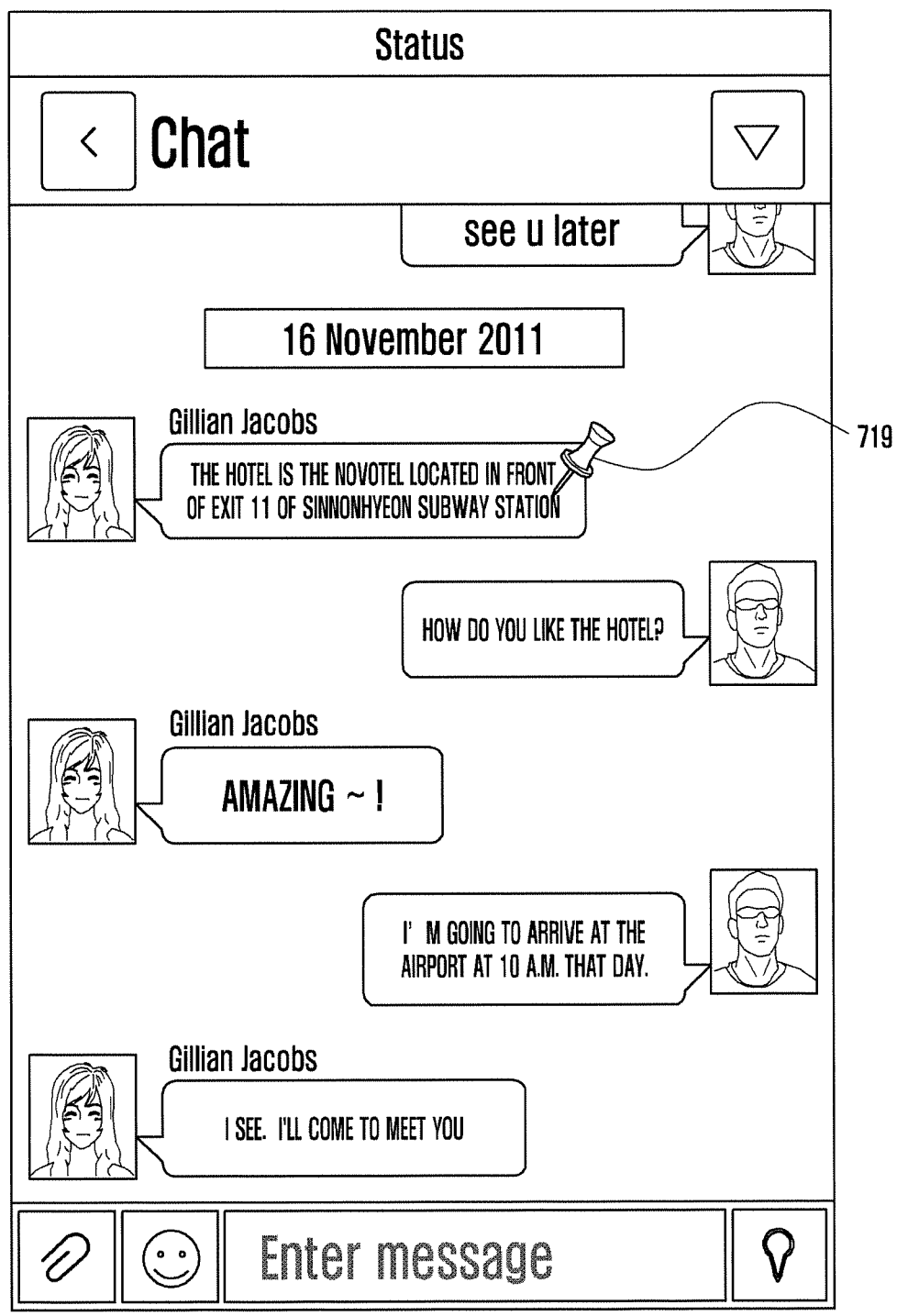

Referring to FIGS. 7A to 7D, the controller 140 may display a one-to-one chat window in a state of transmitting and receiving messages to/from Gillian Jacobs, who is an interlocutor, by executing a messenger application as illustrated in FIG. 7A. When a touch input indicated by reference numeral 703 occurs on a menu item separately installed in a chat window as indicated by reference numeral 701 in FIG. 7A, the controller 140 may display a contexture menu indicated by reference numeral 705 in FIG. 7B. The contexture menu 705 may include an Invite buddies item, a Chat info item, an Alert off item, a Translate item, and a PIN message item, but is not limited thereto. When a touch input occurs on the PIN message item of the contexture menu 705 as indicated by reference numeral 707, the controller 140 may display marked messages that the user has set among messages of Gillian Jacobs, an interlocutor, in the form of a list as illustrated in FIG. 7C. In an embodiment, the messages that the user has set among messages of Gillian Jacobs are indicated by reference numerals 709, 711, 713 and 715. In an embodiment, when a touch input occurs on a marked message item 709 as indicated by reference numeral 717, the controller 140 may switch to and display a chat window including the marked message 709, as illustrated in FIG. 7D. As indicated by reference numeral 719 in FIG. 7D, the controller 140 may cause a scroll bar to automatically move to a point of the marked message 709 in the chat window, and may display the chat window in such a manner that the scroll bar focuses on the marked message 709. Also, the controller 140 may simultaneously display messages before and/or after the marked message 709, with the point of the marked message 709 as a reference.

Although the method for extracting a marked message is described in the case of the one-to-one chat window as illustrated in FIGS. 7A to 7D, embodiments of the present disclosure are not limited thereto, and may include a method for extracting a marked message from a group chat window. In an embodiment, only marked messages related to multiple interlocutors included in a group may be filtered from the group chat window, and may be displayed in the form of a list. When an input corresponding to the selection of each of the marked messages is received, it is possible to switch to and display a relevant message window.

FIGS. 8A to 8D illustrate views for explaining a method for extracting a marked message from an interlocutor list screen according to an embodiment of the present disclosure.

In an embodiment of the present disclosure, a case will be described in which a screen displayed by executing a messenger application as illustrated in FIGS. 8A to 8D is an interlocutor list screen.

Figure 8A:
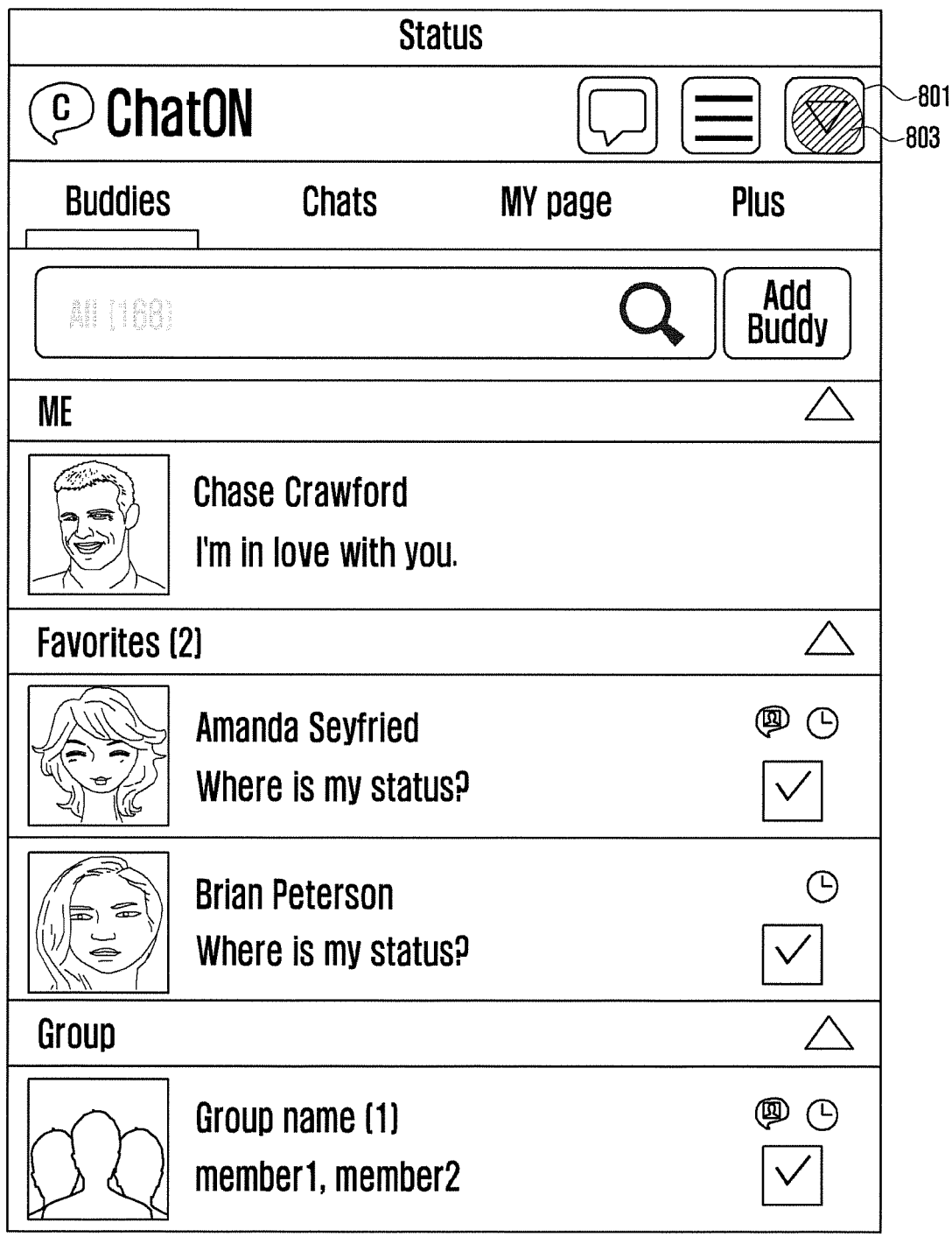
Figure 8B:
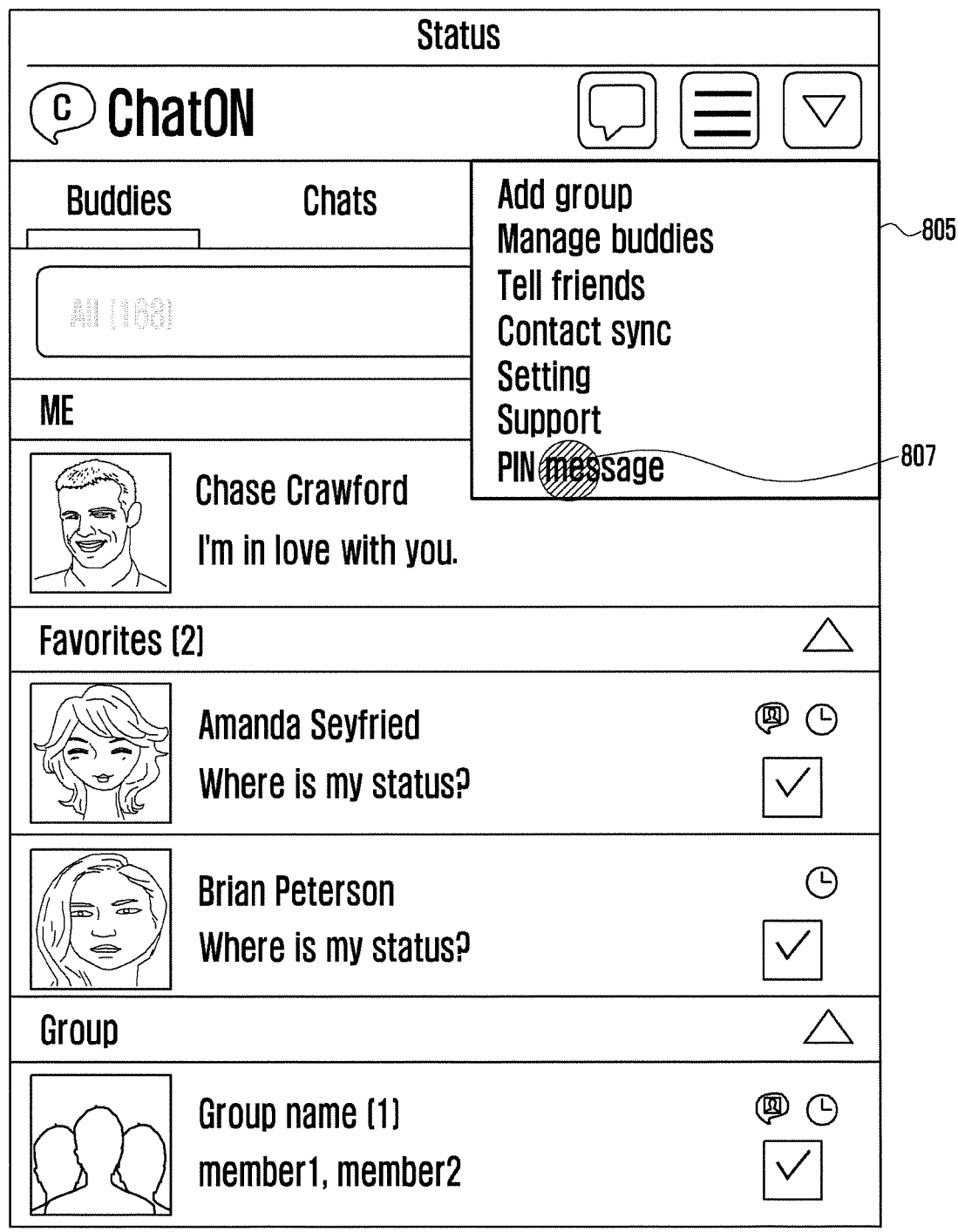

Referring to FIGS. 8A to 8D, the controller 140 may display an interlocutor list screen by executing a messenger application, as illustrated in FIG. 8A. When a touch input occurs (as indicated by reference numeral 803) on a menu item separately installed in the interlocutor list screen as indicated by reference numeral 801, the controller 140 may display a contexture menu indicated by reference numeral 805 in FIG. 8B. In an embodiment, the contexture menu 805 on the interlocutor list screen may include an Add group item, a Manage buddies item, a Tell friends item, a Contact sync item, a Setting item, a Support item, and a PIN message item. When a touch input occurs on the PIN message item of the contexture menu 805 as indicated by reference numeral 807, the controller 140 may display marked messages related to each interlocutor included in the interlocutor list in the form of a list, as illustrated in FIG. 8C. In this case, marked messages of the list may be arranged on the basis of an interlocutor. For example, marked messages of the list may be displayed on the basis of an interlocutor, such as Gillian Jacobs who is an interlocutor and is indicated by reference numeral 809, Soo-Jung Kim who is an interlocutor and is indicated by reference numeral 811, Amanda Seyfried who is an interlocutor and is indicated by reference numeral 813, and Brian Peterson who is an interlocutor and is indicated by reference numeral 815, as illustrated in FIG. 8C. Marked messages related to Gillian Jacobs, who is an interlocutor and is indicated by reference numeral 809, may include two marked messages 817 and 819. Also, marked messages related to Soo-Jung Kim, who is an interlocutor and is indicated by reference numeral 811, may include two marked messages 821 and 823. By using the number of messages expressed beside a name of each interlocutor, it may be identified that the number of marked messages related to Amanda Seyfried is equal to 7 and the number of marked messages related to Brian Peterson is equal to 1.

Figure 8D:
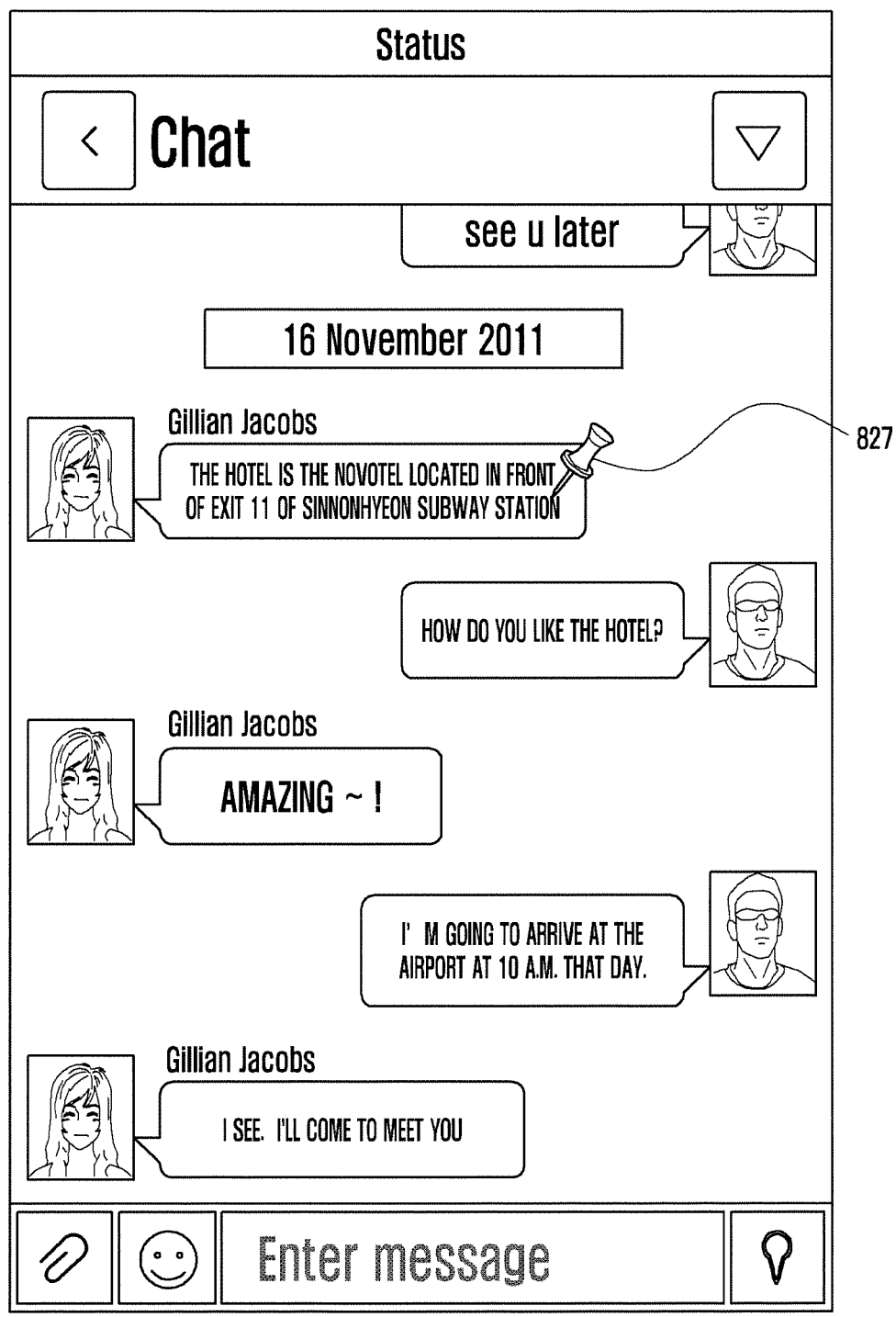

Also, a marked message may be displayed or hidden according to whether a touch input occurs on an interlocutor name item. For example, when a touch input occurs on the interlocutor name item in a state of displaying the marked message, the marked message may be changed to and be displayed in a hidden state. Alternatively, when a touch input occurs on the interlocutor name item in a state of hiding the marked message, the marked message may be changed to and be displayed in an unfolded state. When a touch input occurs on the marked message 817 in the marked message list illustrated in FIG. 8C as indicated by reference numeral 825, the controller 140 may switch to and display a chat window including the marked message 817, as illustrated in FIG. 8D. Then, as indicated by reference numeral 827 in FIG. 8D, the controller 140 may cause a scroll bar to automatically move to a point of the marked message 817 in the chat window, and may display the chat window in such a manner that the scroll bar focuses on the marked message 817. Also, the controller 140 may simultaneously display messages before and/or after the marked message 817, with the point of the marked message 817 as a reference.

Figure 9:
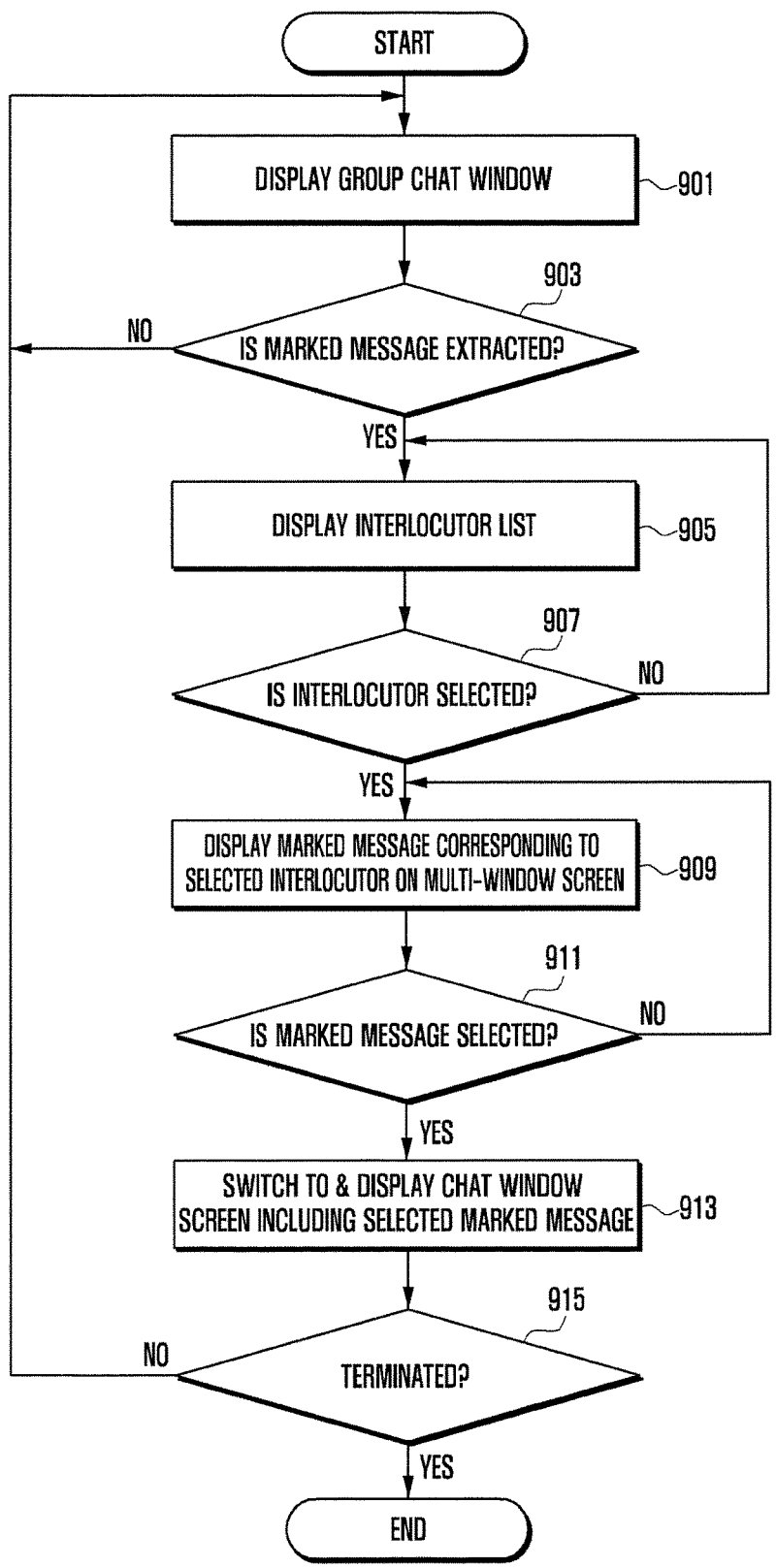
FIG. 9 illustrates a process for extracting a marked message in a messenger application according to an embodiment of the present disclosure.

FIG. 9 illustrates a process for extracting a marked message in a messenger application according to an embodiment of the present disclosure.

In an embodiment of the present disclosure, FIG. 9 explains a method for displaying an interlocutor list corresponding to a group in order to search for a message according to an interlocutor in a group chat window, and filtering and displaying a message of an interlocutor selected from the interlocutor list.

Referring to FIG. 9, in operation 901, the controller 140 may control the display unit 131 to display a group chat window screen for transmitting and receiving messages to/from at least two interlocutors. In operation 903, the controller 140 may determine whether a gesture for extracting a message of an interlocutor is sensed on the group chat window screen displayed by the display unit 131. In an embodiment of the present disclosure, a case will be described in which the gesture is a touch input on a menu item separately installed in a chat window. When a gesture occurs for extracting a marked message corresponding to an interlocutor, in operation 905, the controller 140 may control the display unit 131 to display an interlocutor list. The controller 140 may determine whether one interlocutor is selected from the displayed interlocutor list. When one interlocutor is selected from the displayed interlocutor list, in operation 907, the controller 140 may sense the selection of the one interlocutor, and, in operation 909, may filter and display a marked message corresponding to the selected interlocutor. In an embodiment, the controller 140 may control the display unit 131 to display the filtered marked message in the form of a multi-window, into which a screen of the electronic device has been divided. The multi-window screen, which is displayed after being divided into parts on one screen, may be displayed in an area at at least one of the upper side, lower side, left side and right side of the group chat window. In an embodiment of the present disclosure, a case will be described in which a message window displaying the filtered marked message is displayed in a lower area of the screen. In operation 911, the controller 140 may determine whether one message is selected from among the filtered messages displayed on the screen. When one message is selected, the controller 140 may detect a position of the relevant message on the basis of metadata, such as data, time, an interlocutor, and the like of the relevant message. In operation 913, after switching to a chat window screen including the selected marked message, the controller 140 may cause a scroll bar to automatically move to a point of the selected marked message in the chat window, and may display the chat window in such a manner that the scroll bar focuses on the selected marked message.

Specific execution blocks of the method illustrated in FIG. 9 will be described in detail with reference to FIGS. 10A to 10E.

FIGS. 10A to 10E illustrate views for explaining a method for extracting a marked message from a group chat window according to an embodiment of the present disclosure.

Figure 10A:
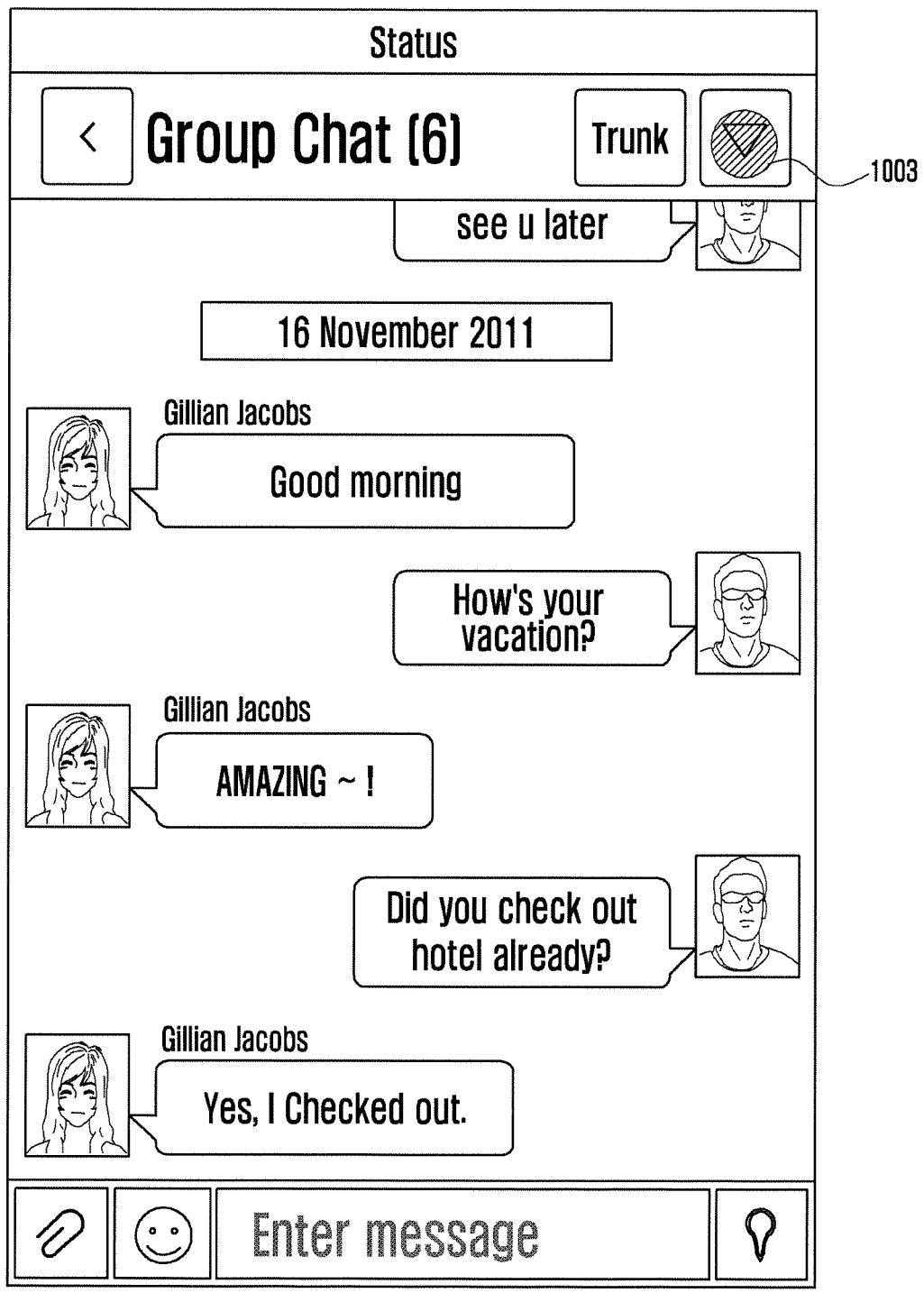
FIGS. 10A to 10E illustrate views for explaining a method for extracting a marked message from a group chat window according to an embodiment of the present disclosure.
Figure 10B:
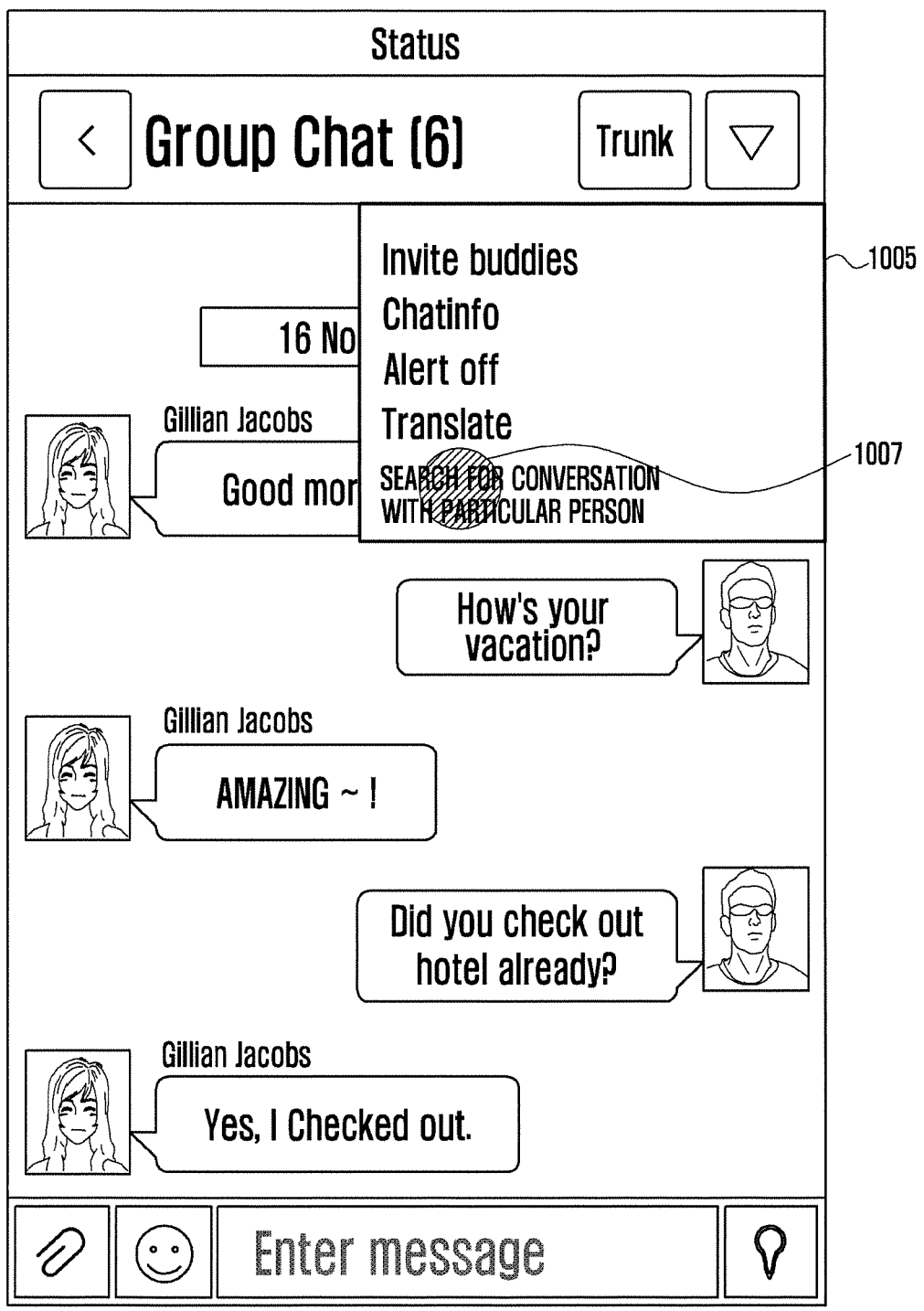
Figure 10C:
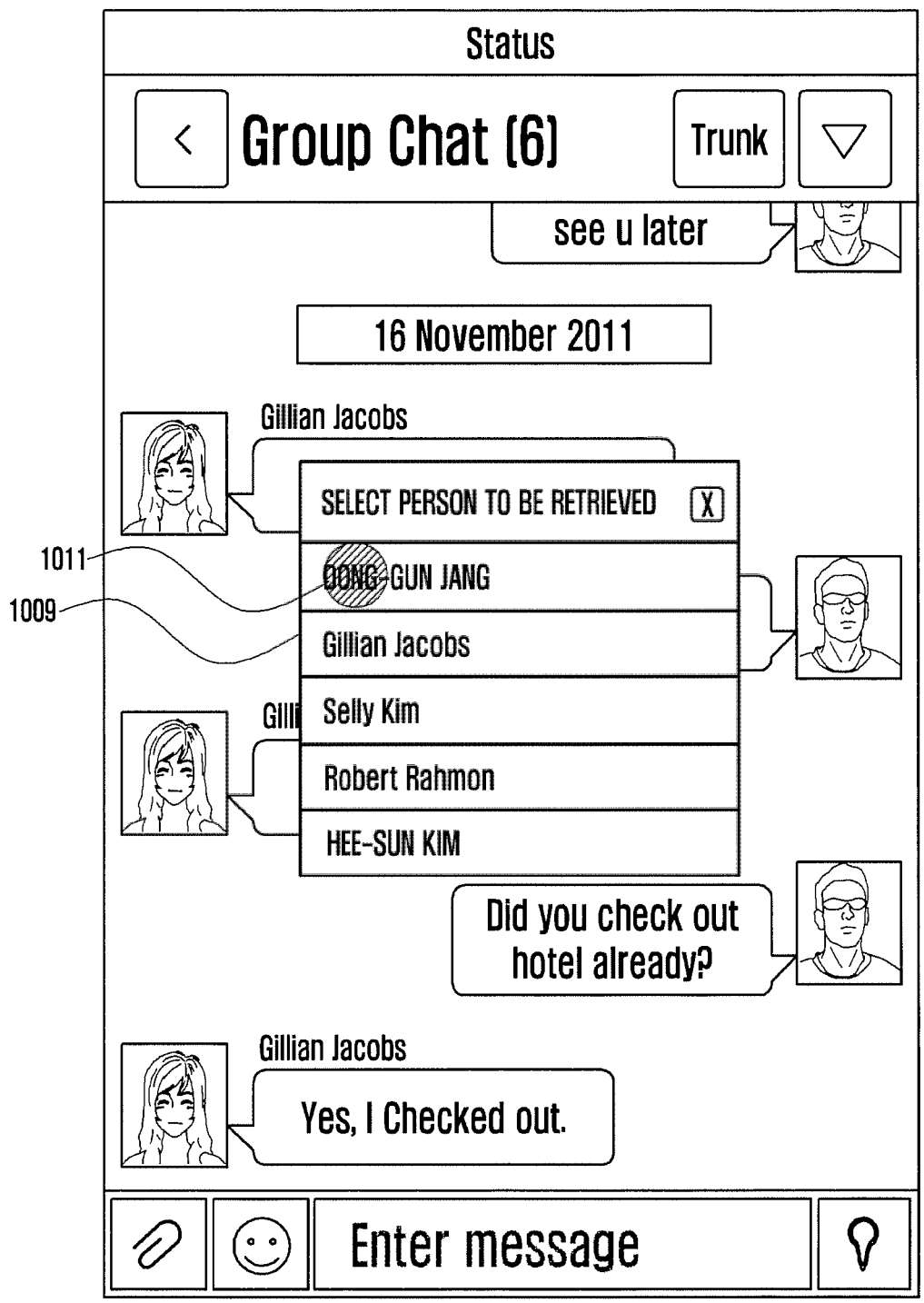
Figure 10D:
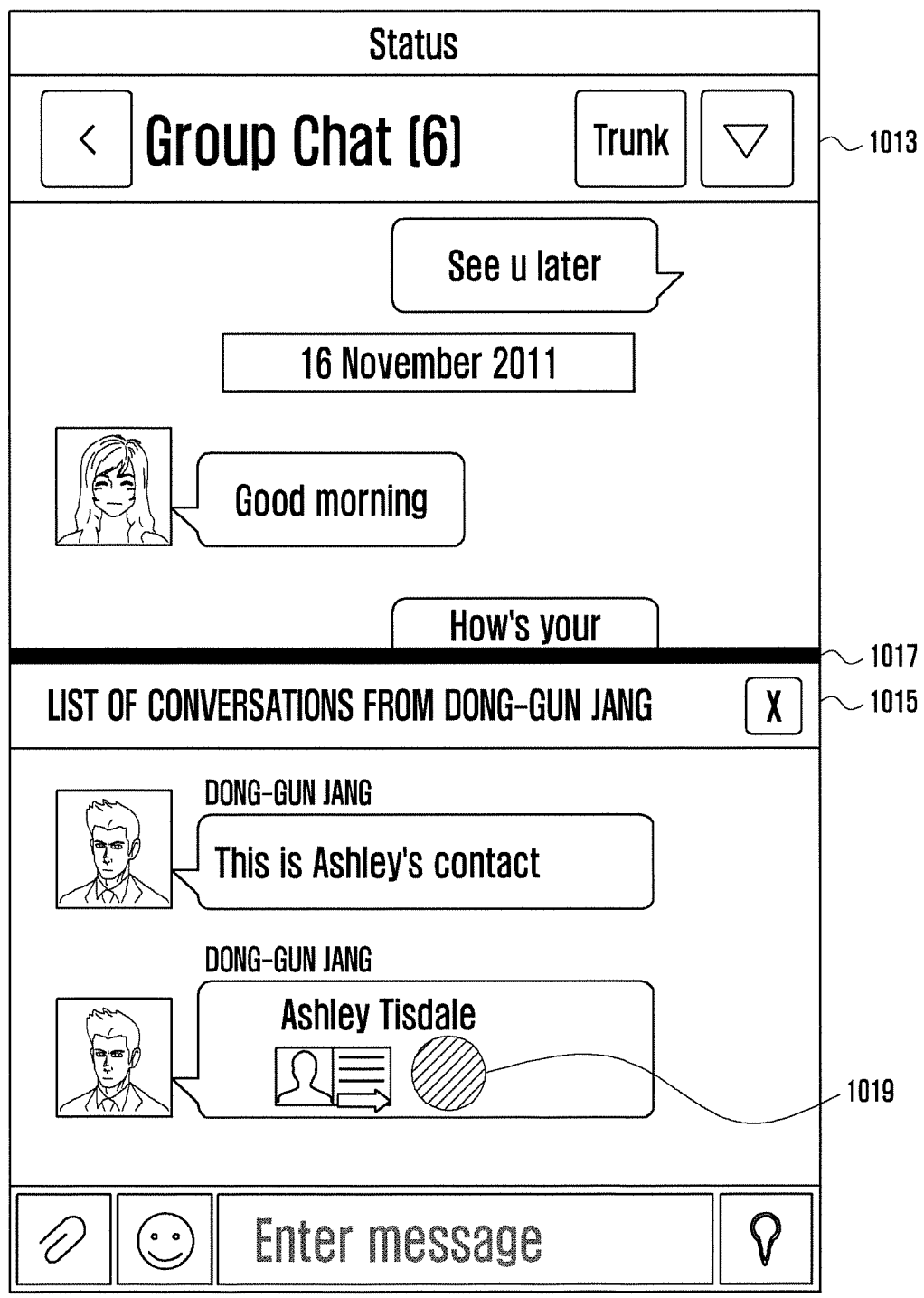
Figure 10E:
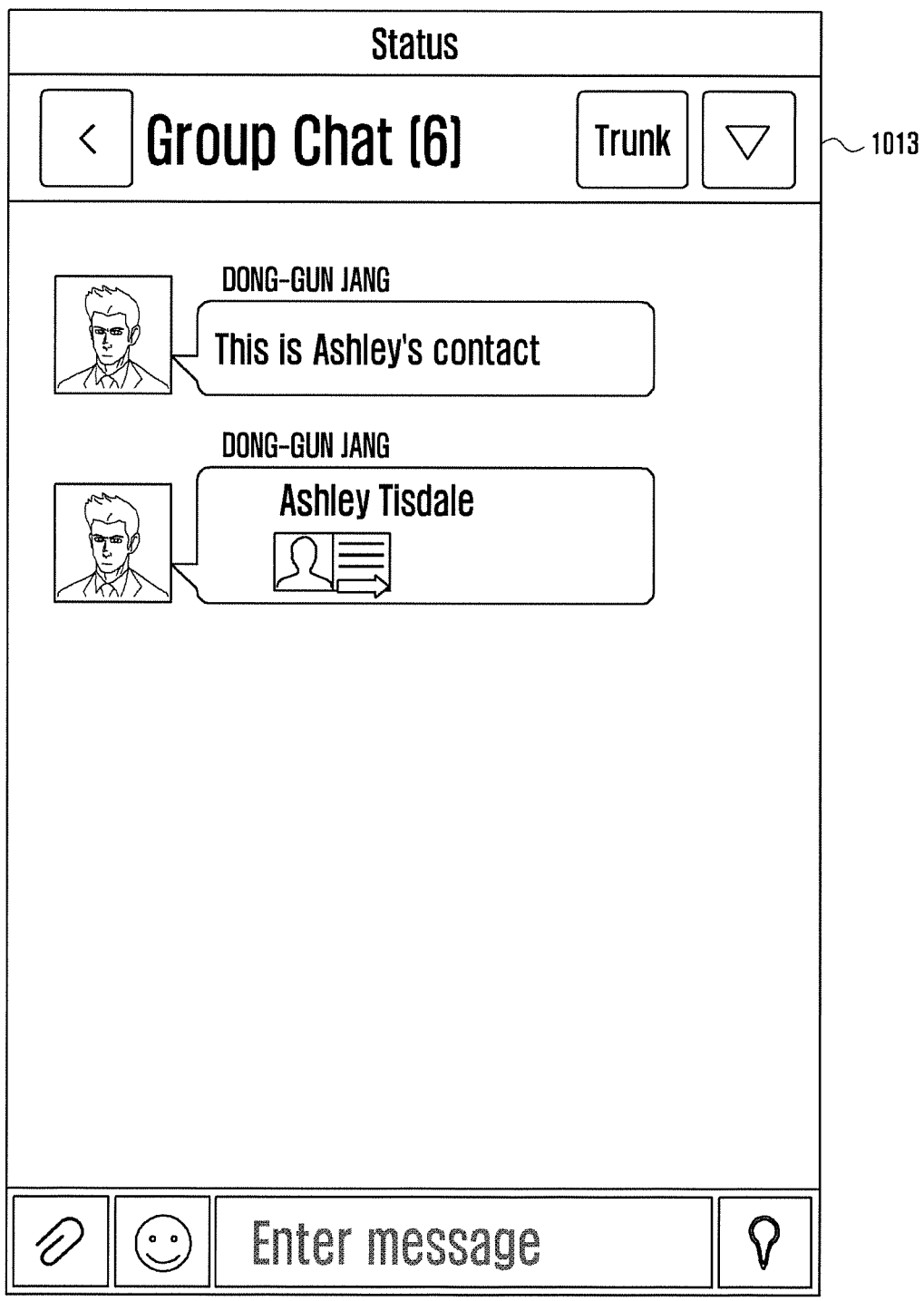

Referring to FIGS. 10A to 10E, the controller 140 may display a group chat window including messages transmitted and received to/from at least two interlocutors, as illustrated in FIG. 10A. The controller 140 may sense a gesture for filtering a marked message of a particular person in the displayed group chat window, as indicated by reference numeral 1003. When the gesture occurs for filtering the marked message of the particular person, the controller 140 may display a contexture menu indicated by reference numeral 1005 in FIG. 1013. The displayed contexture menu may include an Invite buddies item, a Chat info item, an Alert off item, a Translate item, and an item for searching for conversation with particular person, but is not limited thereto. When a touch input is sensed on the item for searching for conversation with particular person of the contexture menu 1005 as indicated by reference numeral 1007, the controller 140 may display interlocutors, which are included in the group chat window, in the form of a list as indicated by reference numeral 1009 in FIG. 10C. When a touch input occurs in the interlocutor list 1009 as indicated by reference numeral 1011, the controller 140 may display the existing group chat window as indicated by reference numeral 1013 in FIG. 10D, and simultaneously, may display a filtered message window including the filtered messages obtained by filtering the marked messages of the selected interlocutor at a lower part of the screen, as indicated by reference numeral 1015. Reference numeral 1017 in FIG. 10D indicates a boundary between the existing group chat window and the filtered message window, and the size of each window may be adjusted through a gesture for touch and upward drag and/or downward drag, which starts from the boundary 1017. When a touch input occurs in the filtered message window 1015 as indicated by reference numeral 1019, after switching to a chat window screen including the selected message as illustrated in FIG. 10E, the controller 140 may cause a scroll bar to automatically move to a point of the selected message in the chat window, and may display the chat window in such a manner that the scroll bar focuses on the selected message.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for managing messages in an electronic device, the method comprising:
   providing a user interface for displaying any of a plurality of chat windows, wherein the plurality of chat windows includes first and second chat windows selectable for display in the user interface and wherein the first chat window is associated with one or more messages transmitted to or received from at least a first interlocutor and the second chat window is associated with one or more messages transmitted to or received from at least a second interlocutor, wherein the first interlocutor and the second interlocutor are different from a user of the electronic device;
   receiving a first message corresponding to the one or more messages associated with the first chat window;
   transmitting a second message corresponding to the one or more messages associated with the first chat window;
   in response to selecting the first chat window among the plurality of chat windows, displaying, on a touch screen of the electronic device, the first chat window comprising the first and second messages in a chronological order;
   in response to detecting a first touch input for selecting one of the first and second messages included in the display of the first chat window, displaying an icon for indicating the selected one of the first and second messages as a marked message;
   in response to detecting a second touch input, displaying a list of marked messages of the plurality of chat windows, the marked messages including the marked message of the first chat window and a second marked message of the second chat window;
   in response to detecting a third touch input for selecting a marked message included in the list of the marked messages, switching from displaying the list of the marked messages to displaying one of the first chat window or the second chat window corresponding to the selected marked message such that a message corresponding to the selected marked message is automatically positioned within a viewing area of the displayed one of the first chat window or the second chat window;
   deleting the displayed one of the first chat window or the second chat window wherein the deleting does not delete the message corresponding to the selected marked message, which was included in the displayed one of the first chat window or the second chat window; and
   based on the deleting, displaying the message corresponding to the selected marked message while preventing switching to the displayed one of the first chat window or the second chat window.

2. The method of claim 1, wherein the switching from displaying the list of the marked messages to displaying one of the first chat window or the second chat window comprises displaying both the marked message included in the list of the marked messages and adjacent messages of the marked message included in the list of the marked messages in the viewing area of the displayed one of the first chat window and or the second chat window.

3. The method of claim 1, wherein at least one marked message included in the list of the marked messages is displayed in a chronological order.

4. The method of claim 1, wherein the displaying the list of the marked messages comprises displaying marked messages associated with at least one interlocutor.

5. The method of claim 4, wherein the displaying the list of the marked messages comprises displaying the marked messages based on the at least one interlocutor.

6. The method of claim 4, wherein the displaying the list of the marked messages comprises:
   in response to detecting the second touch input, displaying a list of interlocutors including at least two interlocutors connected to the first chat window if the first chat window includes at least one message associated with the at least two interlocutors; and
   displaying at least one marked message associated with an interlocutor if the interlocutor is selected from the list of the interlocutors.

7. The method of claim 1, wherein the marked messages comprise at least one of a text message, voice data, or image data.

8. The method of claim 1, wherein the displaying the icon for indicating the selected one of the first and second messages as the marked message comprises:
   mapping the selected marked message to metadata of the selected marked message; and
   storing the selected marked message mapped to the metadata of the selected marked message.

9. The method of claim 8, wherein the metadata comprises at least one of a name of at least one interlocutor, a marked message associated with the at least one interlocutor and a number of marked messages associated with the at least one interlocutor, or data and time information corresponding to the marked message.

10. The method of claim 1, wherein the first message comprising at least one interlocutor and the second message are displayed in the viewing area of the first chat window.

11. The method of claim 1, wherein the plurality of chat windows comprises at least one of a social network service (SNS) application, an email service application, a one-to-one and group chatting messenger service application or a message service application for exchanging text and multimedia messages.

12. An electronic device, comprising:
   a touch screen;
   a processor operatively coupled to the touch screen; and
   a memory operatively coupled to the processor, wherein the memory stores instructions that, when executed by the processor, cause the electronic device to:
      provide a user interface for displaying any of a plurality of chat windows, wherein the plurality of chat windows includes first and second chat windows selectable for display in the user interface and wherein the first chat window is associated with one or more messages transmitted to or received from at least a first interlocutor and the second chat window is associated with one or more messages transmitted to or received from at least a second interlocutor, wherein the first interlocutor and the second interlocutor are different from a user of the electronic device,
      receive a first message corresponding to the one or more messages associated with the first chat window,
      transmit a second message corresponding to the one or more messages associated with the first chat window, in response to selecting the first chat window among the plurality of chat windows, display, on the touch screen of the electronic device, the first chat window comprising the first and second messages in a chronological order, display, in response to detecting a first touch input for selecting one of the first and second messages included in the first chat window, an icon for indicating the selected one of the first and second messages as a marked message, display, in response to detecting a second touch input, a list of marked messages of the plurality of chat windows, the marked messages including the marked message of the first chat window and a second marked message of the second chat window, in response to detecting a third touch input for selecting a marked message included in the list of the marked messages, switch from displaying the list of the marked messages to displaying one of the first chat window or the second chat window corresponding to the selected marked message such that a message corresponding to the selected marked message is automatically positioned within a viewing area of the displayed one of the first chat window or the second chat window, delete the displayed one of the first chat window or the second chat window wherein the deleting does not delete the message corresponding to the selected marked message, which was included in the displayed one of the first chat window or the second chat window, and based on the deleting, display the message corresponding to the selected marked message while preventing switching to the displayed one of the first chat window or the second chat window.

13. The electronic device of claim 12, wherein the instructions further cause the electronic device to display both the marked message included in the list of the marked messages and adjacent messages of the marked message included in the list of the marked messages in the viewing area of the displayed one of the first chat window or the second chat window.

14. The electronic device of claim 12, wherein the instructions further cause the electronic device to display at least one marked message included in the list of the marked messages in a chronological order.

15. The electronic device of claim 12, wherein the instructions further cause the electronic device to display marked messages associated with at least one interlocutor.

16. The electronic device of claim 15, wherein the instructions further cause the electronic device to display the marked messages associated with the at least one interlocutor based on the at least one interlocutor.

17. The electronic device of claim 16, wherein the instructions further cause the electronic device to:

in response to detecting the second touch input, display a list of interlocutors including at least two interlocutors connected to the first chat window if the first chat window includes at least one message associated with the at least two interlocutors; and display at least one marked message associated with an interlocutor if the interlocutor is selected from the list of the interlocutors.

18. The electronic device of claim 12, wherein the marked messages comprise at least one of a text message, voice data, or image data.

19. The electronic device of claim 12, wherein the instructions further cause the electronic device to:

map the selected marked message to metadata of the selected marked message; and store the selected marked message mapped to the metadata of the selected marked message.

20. An electronic device, comprising:

a touch screen;

a processor operatively coupled to the touch screen; and a memory operatively coupled to the processor, wherein the memory stores instructions that, when executed by the processor, cause the electronic device to:

provide a user interface for displaying any of a plurality of chat windows, wherein the plurality of chat windows includes first and second chat windows selectable for display in the user interface and wherein the first chat window is associated with one or more messages transmitted to or received from at least a first interlocutor and the second chat window is associated with one or more messages transmitted to or received from at least a second interlocutor, wherein the first interlocutor and the second interlocutor are different from a user of the electronic device, receive a first message corresponding to the one or more messages associated with the first chat window, transmit a second message corresponding to the one or more messages associated with the first chat window, in response to selecting the first chat window among the plurality of chat windows, display, on the touch screen of the electronic device, the first chat window comprising the first and second messages in a chronological order, display, in response to detecting a first touch input for selecting at least one of the first and second messages included in the display of the first chat window, an icon for indicating the selected at least one of the first and second messages as a marked message, display, in response to detecting a second touch input, a list of marked messages of the plurality of chat windows, the marked messages including the marked message of the first chat window and a second marked message of the second chat window, in response to detecting a third touch input for selecting a marked message included in the list of the marked messages, switch from displaying the list of the marked messages to displaying one of the first chat window and the second chat window corresponding to the selected marked message such that a message corresponding to the selected marked message is automatically positioned within a viewing area of the displayed one of the first chat window and the second chat window, delete the displayed one of the first chat window and the second chat window wherein the deleting does not delete the message corresponding to the selected marked message, which was included in the displayed one of the first chat window and the second chat window, and based on the deleting, display the message corresponding to the selected marked message while preventing switching to the displayed one of the first chat window and the second chat window.

21. An electronic device, comprising:

a touch screen;

a processor operatively coupled to the touch screen; and a memory operatively coupled to the processor, the memory storing one or more programs, the one or more programs comprising instructions which, when executed by the electronic device, cause the electronic device to:
display, in response to a first touch input, a first screen including a list of marked messages including at least a first marked message of a first chat window associated with one or more messages transmitted to or received from at least a first interlocutor and a second marked message of a second chat window associated with one or more messages transmitted to or received from at least a second interlocutor, wherein the first interlocutor and the second interlocutor are different from a user of the electronic device, each of the marked messages being a message previously selected via a user input as a marked message among messages transmitted to or received from a plurality of entities in a plurality of chat windows including the first and second chat windows, each of the marked messages having been marked with an icon via the user input, in response to a second touch input for selecting one of the marked messages included in the list displayed in the first screen, display a second screen including the selected one of the marked messages and at least one message transmitted to or received from an entity corresponding to the selected one of the marked messages, wherein the second screen comprises a chat window including the selected one of the marked messages and messages transmitted to or received from the entity corresponding to the selected one of the marked messages, and delete the chat window comprised in the second screen wherein the deleting does not delete the selected one of the marked messages, and based on the deleting, display the selected one of the marked messages while preventing switching to the chat window including the selected one of the marked messages and the messages transmitted to or received from the entity corresponding to the selected one of the marked messages.

* * * * *